(12) United States Patent
Kawasaki et al.

(10) Patent No.: US 11,891,145 B2
(45) Date of Patent: Feb. 6, 2024

(54) ESTIMATION DEVICE, VEHICLE, AND ESTIMATION METHOD

(71) Applicant: HONDA MOTOR CO., LTD., Tokyo (JP)

(72) Inventors: Yohei Kawasaki, Tokyo (JP); Yosuke Wada, Tokyo (JP); Shunichi Miyagishi, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 17/952,442

(22) Filed: Sep. 26, 2022

(65) Prior Publication Data
US 2023/0106267 A1 Apr. 6, 2023

(30) Foreign Application Priority Data
Sep. 29, 2021 (JP) .................. 2021-159681

(51) Int. Cl.
*B62K 25/04* (2006.01)
*B62J 45/414* (2020.01)
(Continued)

(52) U.S. Cl.
CPC ............ *B62J 45/414* (2020.02); *B60G 17/06* (2013.01); *B62J 45/412* (2020.02); *B62K 25/04* (2013.01);
(Continued)

(58) Field of Classification Search
CPC ................ B60G 17/06; B60G 2400/25; B60G 2400/252; B62J 45/412; B62J 45/414; B62K 25/04; B62K 2025/044
See application file for complete search history.

(56) References Cited

U.S. PATENT DOCUMENTS 10,906,370 B1\* 2/2021 Hall .................. B60G 17/0157
2008/0059025 A1\* 3/2008 Furuichi ........... B60G 17/0165
701/37
(Continued)

FOREIGN PATENT DOCUMENTS

DE 3714363 A1 11/1987
DE 4141931 A1 6/1993
(Continued)

OTHER PUBLICATIONS

Office Action dated Apr. 17, 2023, issued in counterpart JP Application No. 2021-159681, with English translation. (5 pages).
(Continued)

*Primary Examiner* — James A English
(74) *Attorney, Agent, or Firm* — WHDA, LLP

(57) ABSTRACT

An estimation device estimates a stroke quantity indicating a displacement in an up-and-down direction of a vehicle, in a multistage elastic member in which a plurality of members, each having a different load displacement characteristic indicating a relationship between a load and the displacement, are disposed. The estimation device comprises: a load calculation unit configured to calculate a variable ground contact load received by a wheel of the vehicle from a ground contact surface; a state quantity estimation unit configured to estimate the stroke quantity generated in the multistage elastic member; and a characteristic change unit configured to change a setting of the initial value to an estimated load displacement characteristic.

20 Claims, 8 Drawing Sheets

(51) Int. Cl.
  *B62J 45/412* (2020.01)
  *B60G 17/06* (2006.01)
(52) U.S. Cl.
  CPC .. *B60G 2400/252* (2013.01); *B62K 2025/044* (2013.01)

(56) References Cited

U.S. PATENT DOCUMENTS

| | | | | |
|---|---|---|---|---|
| 2014/0005889 A1* | 1/2014 | Hayakawa | ....... | B60G 17/01933 |
| | | | | 701/37 |
| 2017/0100980 A1* | 4/2017 | Tsuda | ................. | B60G 17/0165 |
| 2023/0099836 A1* | 3/2023 | Kawasaki | ................ | B62J 45/20 |
| | | | | 701/37 |
| 2023/0302382 A1* | 9/2023 | Yokota | ............... | B01D 39/2027 |
| | | | | 435/261 |

FOREIGN PATENT DOCUMENTS

| | | |
|---|---|---|
| DE | 19608617 A1 | 9/1997 |
| EP | 3489048 A1 | 5/2019 |
| JP | S56083633 A | 7/1981 |
| JP | H04-008930 A | 1/1992 |
| JP | 2005-300254 A | 10/2005 |
| JP | 2016-160968 A | 9/2016 |
| JP | 2019-151124 A | 9/2019 |
| JP | 2020-117196 A | 8/2020 |

OTHER PUBLICATIONS

Office Action dated Apr. 5, 2023, issued in counterpart DE Application No. 10 2022 124 471.7, with English translation. (7 pages).

\* cited by examiner

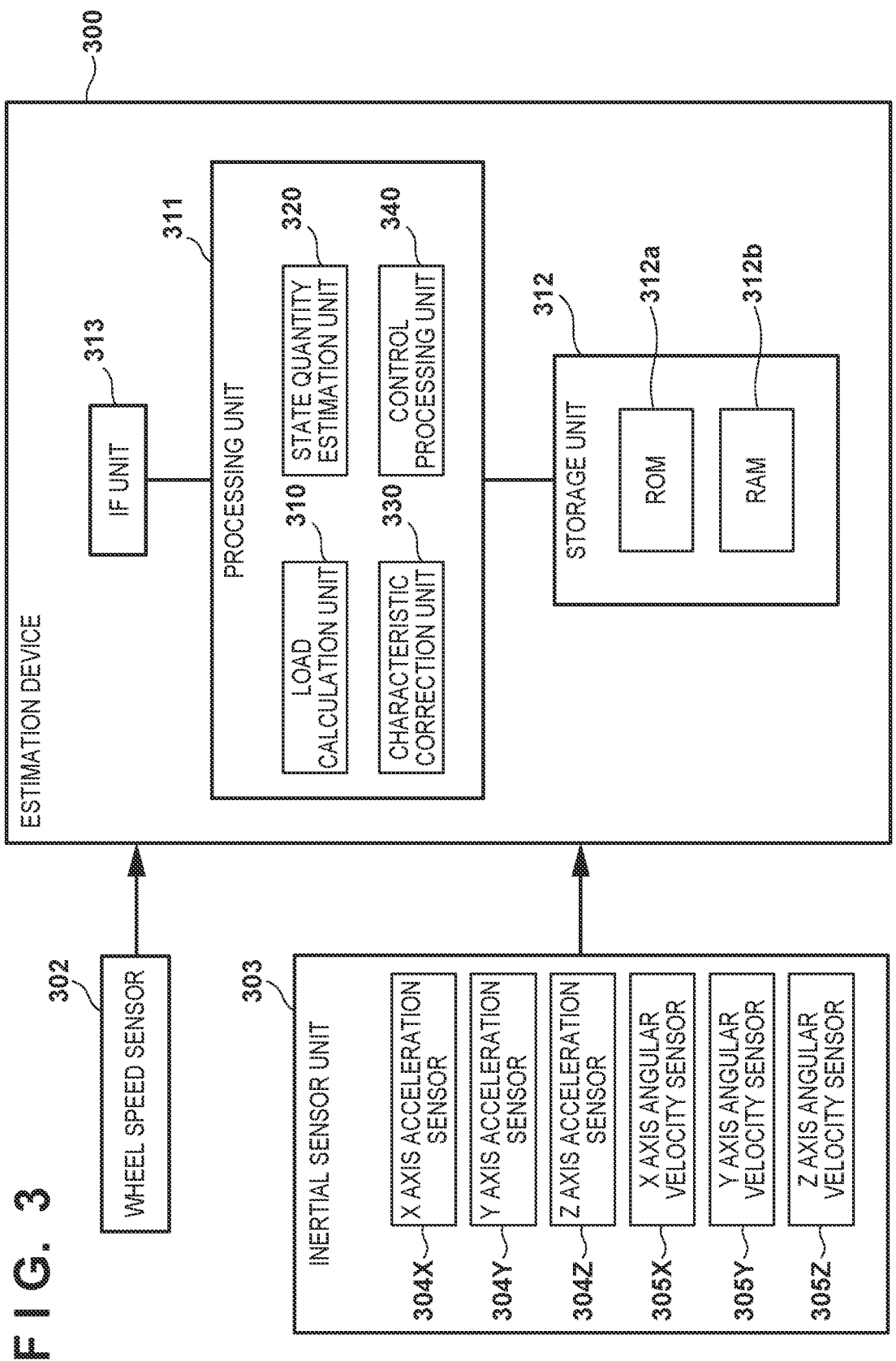

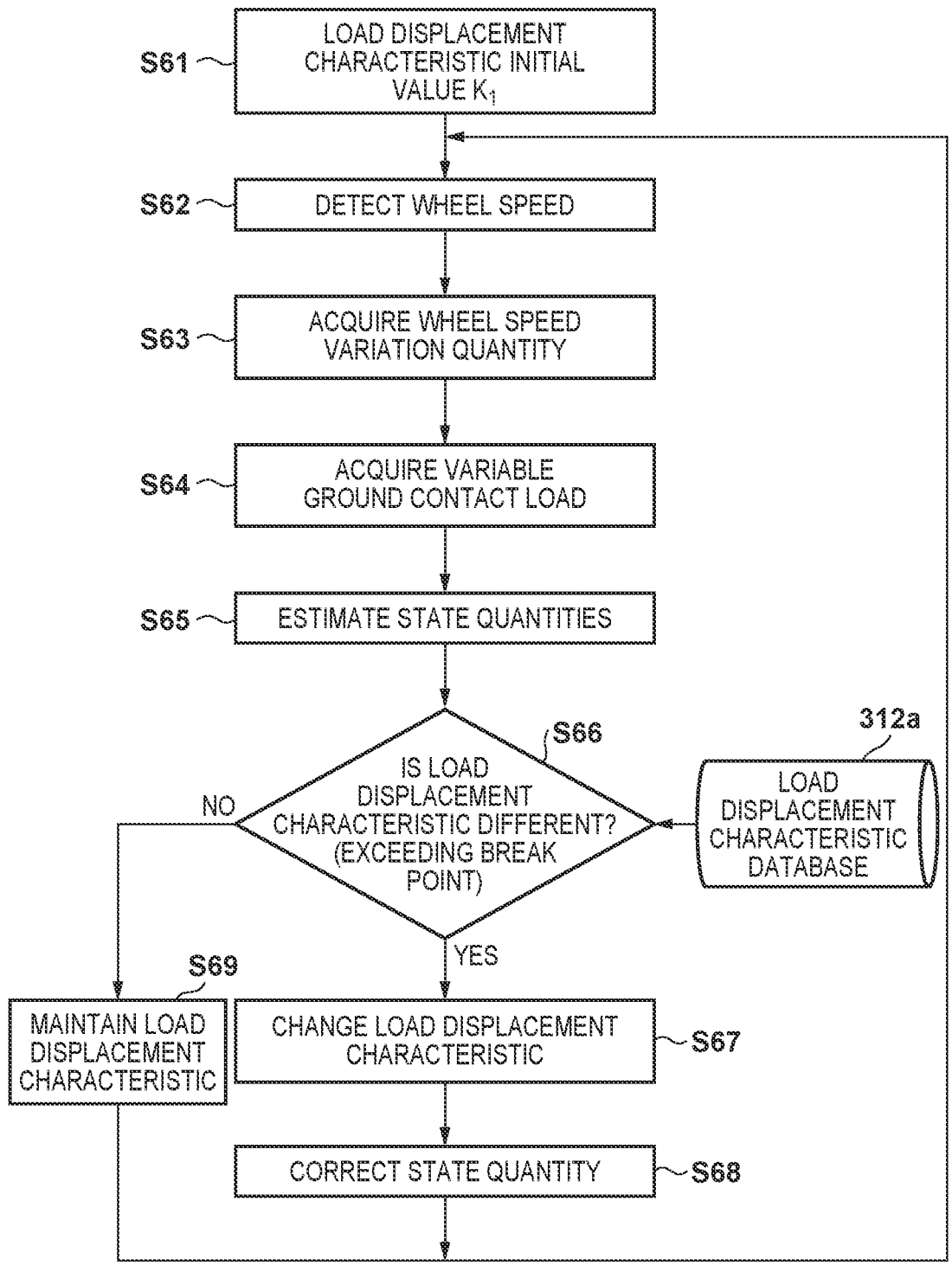

ESTIMATION DEVICE, VEHICLE, AND ESTIMATION METHOD

CROSS-REFERENCE TO RELATED APPLICATION(S)

This application claims priority to and the benefit of Japanese Patent Application No. 2021-159681 filed on Sep. 29, 2021, the entire disclosure of which is incorporated herein by reference.

BACKGROUND OF THE INVENTION

Field of the Invention

The present invention relates to an estimation device, a vehicle, and an estimation method.

Description of the Related Art

Japanese Patent Laid-Open No. 2019-151124 discloses a suspension device for adjusting a lower limit of damping force of a damping portion in skyhook control.

As a configuration for a suspension mechanism in a vehicle, a two-stage spring in which two springs are disposed in an up-and-down direction of the vehicle are used in some cases. In a relationship between a load and a displacement based on spring constants of the two springs, the spring constants are changeable in accordance with a displacement region of a spring in which the displacement (stroke quantity) of the suspension mechanism occurs. For this reason, when an estimation operation is performed for the stroke quantity of the suspension mechanism in the two-stage spring by use of a relationship between the load and the displacement based on one spring constant, an error may occur in the stroke quantity.

In view of the above drawback, the present invention provides an estimation technique capable of improving estimation accuracy for a stroke quantity indicating a displacement in an up-and-down direction of a vehicle, in a multistage elastic member in which a plurality of members, each having a different load displacement characteristic indicating a relationship between a load and the displacement, are disposed.

SUMMARY OF THE INVENTION

According to one aspect of the present invention, there is provided an estimation device that estimates a stroke quantity indicating a displacement in an up-and-down direction of a vehicle, in a multistage elastic member in which a plurality of members, each having a different load displacement characteristic indicating a relationship between a load and the displacement, are disposed, the estimation device comprising:
  a load calculation unit configured to calculate a variable ground contact load received by a wheel of the vehicle from a ground contact surface, based on a detection signal of a wheel speed sensor for detecting a wheel speed of the vehicle;
  a state quantity estimation unit configured to estimate the stroke quantity generated in the multistage elastic member, based on the multistage elastic member and the variable ground contact load, the multistage elastic member having a load displacement characteristic of any one of the plurality of members set as an initial value; and
  a characteristic change unit configured to change a setting of the initial value to an estimated load displacement characteristic, in a case where the estimated load displacement characteristic corresponding to the stroke quantity that is estimated by the state quantity estimation unit and the load displacement characteristic that is set as the initial value are different from each other,
  wherein the state quantity estimation unit corrects the stroke quantity, based on a result of an estimation operation in which the estimated load displacement characteristic that is changed by the characteristic change unit is set as a changed initial value.

According to another aspect of the present invention, there is provided a vehicle including an estimation device that estimates a stroke quantity indicating a displacement in an up-and-down direction of the vehicle, in a multistage elastic member in which a plurality of members, each having a different load displacement characteristic indicating a relationship between a load and the displacement, are disposed, the estimation device comprising:
  a load calculation unit configured to calculate a variable ground contact load received by a wheel of the vehicle from a ground contact surface, based on a detection signal of a wheel speed sensor for detecting a wheel speed of the vehicle;
  a state quantity estimation unit configured to estimate the stroke quantity generated in the multistage elastic member, based on the multistage elastic member and the variable ground contact load, the multistage elastic member having a load displacement characteristic of any one of the plurality of members set as an initial value; and
  a characteristic change unit configured to change a setting of the initial value to an estimated load displacement characteristic, in a case where the estimated load displacement characteristic corresponding to the stroke quantity that is estimated by the state quantity estimation unit and the load displacement characteristic that is set as the initial value are different from each other,
  wherein the state quantity estimation unit corrects the stroke quantity, based on a result of an estimation operation in which the estimated load displacement characteristic that is changed by the characteristic change unit is set as a changed initial value.

According to still another aspect of the present invention, there is provided an estimation method of an estimation device that estimates a stroke quantity indicating a displacement in an up-and-down direction of a vehicle, in a multistage elastic member in which a plurality of members, each having a different load displacement characteristic indicating a relationship between a load and the displacement, are disposed, the estimation method comprising:
  calculating, by a load calculation unit, a variable ground contact load received by a wheel of the vehicle from a ground contact surface, based on a detection signal of a wheel speed sensor for detecting a wheel speed of the vehicle;
  estimating, by a state quantity estimation unit, the stroke quantity generated in the multistage elastic member, based on the multistage elastic member and the variable ground contact load, the multistage elastic member having a load displacement characteristic of any one of the plurality of members set as an initial value;
  changing, by a characteristic change unit, a setting of the initial value to an estimated load displacement characteristic, in a case where the estimated load displacement characteristic corresponding to the stroke quantity that is estimated by the estimating and the load displacement characteristic that is set as the initial value are different from each other; and correcting, by the state quantity estimation unit, the stroke quantity, based on a result of an estimation operation in which the estimated load displacement characteristic that is changed by the changing is set as a changed initial value.

According to the present invention, it is possible to improve the estimation accuracy for a stroke quantity indicating a displacement in an up-and-down direction of a vehicle, in a multistage elastic member in which a plurality of members, each having a different load displacement characteristic indicating a relationship between a load and the displacement, are disposed.

BRIEF DESCRIPTION OF THE DRAWINGS

FIG. 3 is a diagram illustrating a configuration of an estimation device according to an embodiment;

FIG. 6 is a diagram for describing a process flow of the estimation device;

DESCRIPTION OF THE EMBODIMENTS

Figure 1:
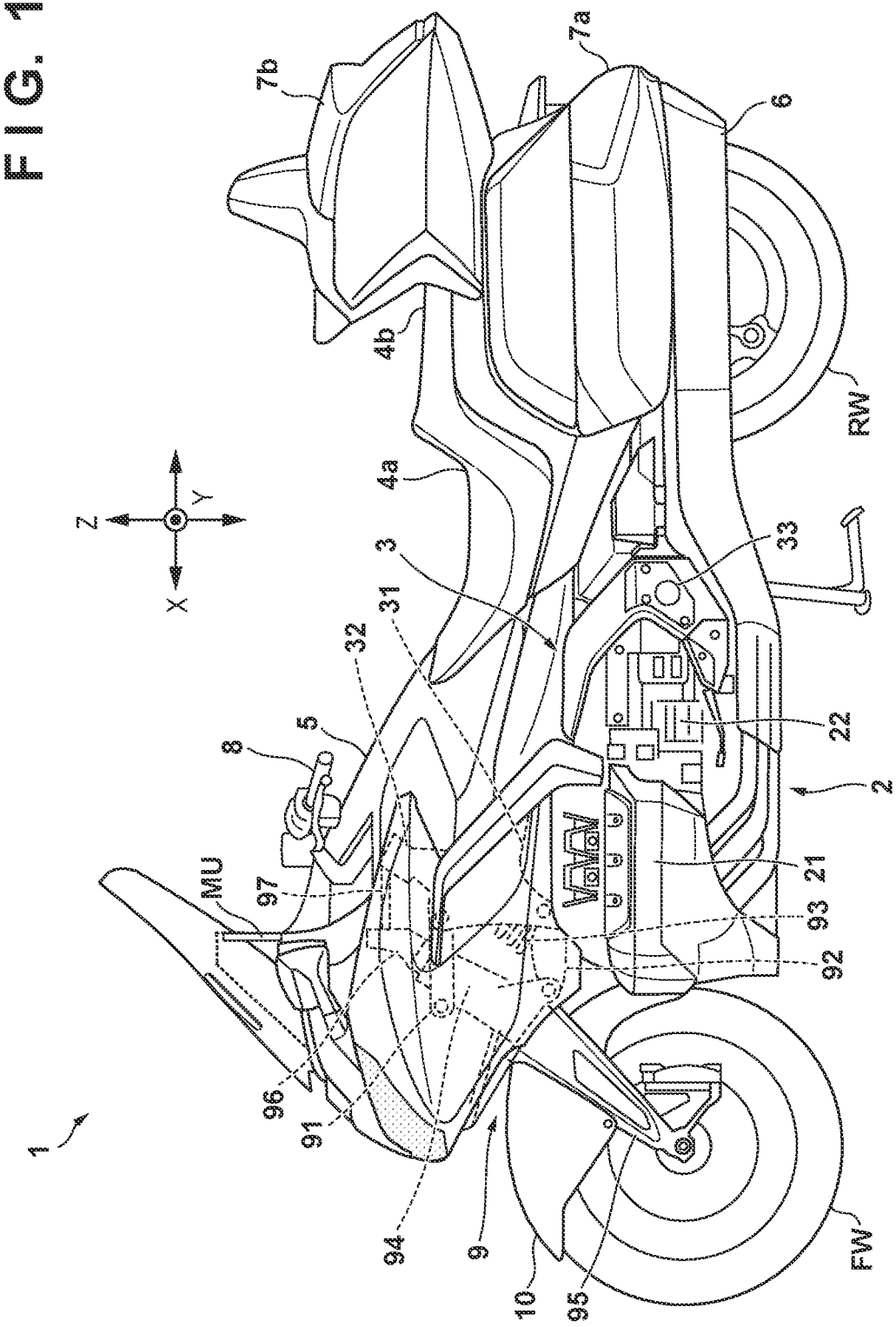
FIG. 1 is a left side view of a straddle type vehicle 1 according to an embodiment of the present invention.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

[Outline of Straddle Type Vehicle]

FIG. 1 is a left side view of a straddle type vehicle 1 according to an embodiment of the present invention. In FIG. 1, arrows X, Y, and Z indicate directions orthogonal to one another, X direction indicates a front-and-rear direction of the straddle type vehicle, Y direction indicates a vehicle width direction (a left-and-right direction) of the straddle type vehicle, and Z direction indicates an up-and-down direction. The present invention is applicable to various straddle type vehicles including other types of motorcycles, and is also applicable to an electric vehicle using a motor as a drive source, in addition to a vehicle using an internal combustion engine as the drive source. In addition, embodiments of the present invention are also applicable to a four-wheeled vehicle or a moving body including a mechanism similar to a vibration reduction mechanism 94 in the present embodiment to be described below. Hereinafter, a straddle type vehicle 1 will be referred to as the vehicle 1, in some cases.

The vehicle 1 includes a power unit 2 between a front wheel FW and a rear wheel RW. The power unit 2 includes an engine 21 and a transmission 22. The driving force of the transmission 22 is transmitted to the rear wheel RW through a drive shaft, not illustrated, to rotate the rear wheel RW.

The power unit 2 is supported by the vehicle body frame 3. The vehicle body frame 3 includes a pair of left and right main frames 31 extending in X direction. A fuel tank 5 and an air cleaner box (not illustrated) are disposed above the main frames 31. A meter unit MU for displaying various types of information to an occupant (rider) is provided on a front side of the fuel tank 5.

Ahead pipe 32, which rotatably supports a steering shaft (not illustrated) rotated by a handlebar 8, is provided at a front end portion of the main frame 31. At a rear end portion of the main frames 31, a pair of left and right pivot plates 33 are provided. Lower end portions of the pivot plates 33 and front end portions of the main frames 31 are connected by a pair of left and right lower arms (not illustrated), and the power unit 2 is supported by the main frames 31 and the lower arms. A pair of left and right seat rails extending rearward are also provided at the rear end portion of the main frame 31, and a seat 4a on which a rider is seated, a seat 4b on which a passenger is seated, a rear trunk 7b, and the like are supported on the seat rails.

A front end portion of a rear swing arm (not illustrated) extending in the front-and-rear direction is swingably supported by the pivot plates 33. The rear swing arm is swingable in the up-and-down direction, and the rear wheel RW is supported at a rear end portion of the rear swing arm. An exhaust muffler 6 that muffles exhaust of the engine 21 extends in X direction on a lower lateral side of the rear wheel RW. Left and right saddle backs 7a are provided on an upper lateral side of the rear wheel RW.

At the front end portions of the main frames 31, a front suspension mechanism 9, which supports the front wheel FW, is constituted. The front suspension mechanism 9 includes an upper link 91, a lower link 92, a fork support body 93, a vibration reduction mechanism 94 (cushion unit), and a pair of left and right front forks 95. In the front suspension mechanism 9, the upper link 91, the lower link 92, the fork support body 93, and the vibration reduction mechanism 94 constitute a support mechanism for supporting the front forks 95 of the vehicle 1.

The upper link 91 and the lower link 92 are vertically disposed at the front end portions of the main frames 31. Rear end portions of the upper link 91 and the lower link 92 are swingably coupled with the front end portions of the main frames 31. The upper link 91 and the lower link 92 are swingably coupled with the fork support body 93.

The fork support body 93 has a tubular shape, and is inclined rearward. A steering shaft 96 is supported by the fork support body 93 so as to be rotatable about the axis of the steering shaft 96. The steering shaft 96 includes a shaft portion (not illustrated), which is inserted into the fork support body 93. A bridge (not illustrated) is provided at a lower end portion of the steering shaft 96, and the pair of left and right front forks 95 are supported by the bridge. The front wheel FW is rotatably supported by the front forks 95. An upper end portion of the steering shaft 96 is coupled with a steering shaft (not illustrated) to be rotated by the handlebar 8 through a link 97. An upper part of the front wheel FW is covered with a fender 10, and the fender 10 is supported by the front forks 95.

The vibration reduction mechanism 94 includes a multistage elastic member configured by disposing a vibration reduction member such as a spring or rubber in the up-and-down direction of the vehicle 1, and a viscous damping member. The vibration reduction mechanism 94 in the present embodiment has a configuration of a multistage spring in which a plurality of coil springs are disposed in the up-and-down direction of the vehicle 1, as a configuration example of the multistage elastic member. The configuration example of the multistage elastic member (multistage spring) will be described with reference to FIGS. 2A and 2B. An upper end portion of the vibration reduction mechanism 94 is swingably supported by the main frames 31. In addition, a lower end portion of the vibration reduction mechanism 94 is swingably supported by the lower link 92.

[Configuration of Multistage Elastic Member]

Figure 2A:
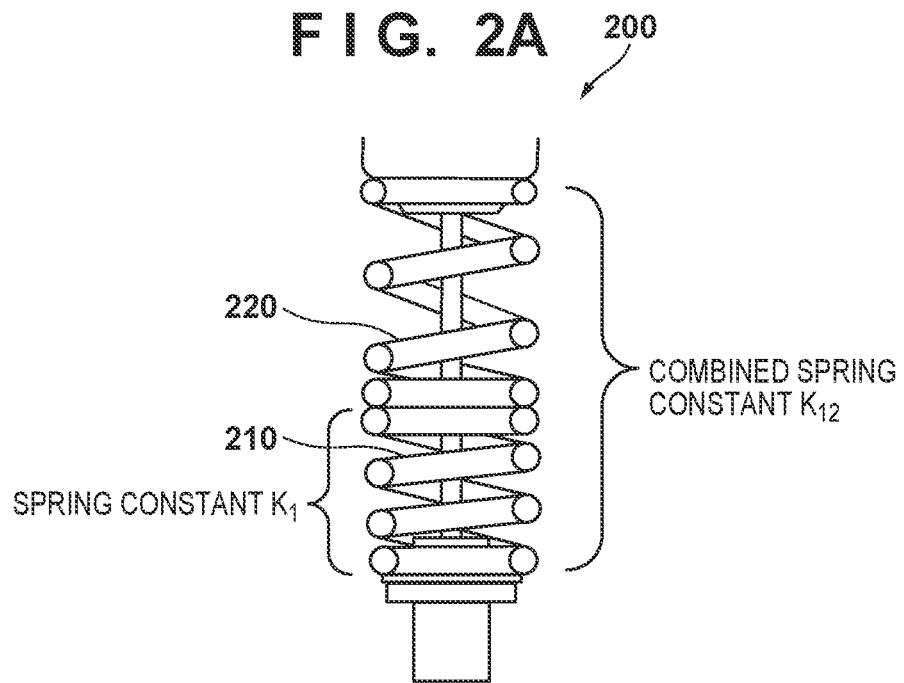
FIG. 2A is a diagram illustrating a schematic configuration example of a multistage elastic member in a first embodiment.
Figure 2B:
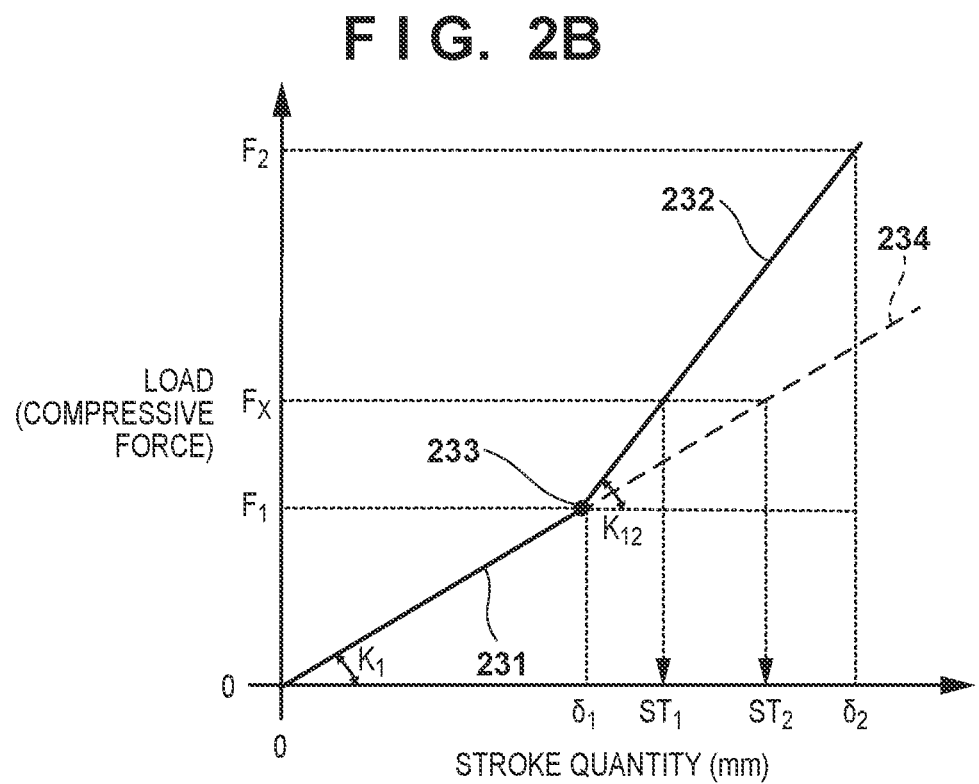
FIG. 2B is a diagram illustrating a relationship between a load and a stroke quantity.

FIG. 2A is a diagram illustrating a schematic configuration example of a multistage elastic member 200 constituting the vibration reduction mechanism 94 in the first embodiment, and FIG. 2B is a diagram illustrating a relationship between a load (compressive force) acting on the multistage elastic member 200 and a stroke quantity (displacement quantity).

In the configuration example illustrated in FIG. 2A, two coil springs are disposed in the up-and-down direction of the vehicle 1. However, the configuration of the multistage elastic member 200 (multistage spring) is not limited to this example, and two or more coil springs can be disposed and configured in the up-and-down direction of the vehicle 1.

In addition, the member constituting the multistage elastic member 200 is not limited to the coil spring, and may be various springs. For example, non-linear displacement characteristics may be acquired by a coil spring having an unequal pitch, a conical shape, or a barrel shape. A vibration-proof member such as rubber may be used, as long as the stroke quantity corresponding to the load can be acquired. In addition, a combination of a plurality of coil springs and the rubber may be used. A configuration example of the multistage elastic member in which the coil spring and the rubber are combined will be specifically described in the second embodiment, and a configuration example of the multistage elastic member in which the plurality of coil springs and the rubber are combined will be specifically described in the third embodiment.

In the present embodiment, as illustrated in FIG. 2A, the multistage elastic member 200 constituting the vibration reduction mechanism 94 has a configuration of a multistage spring in which a first coil spring (initial spring) 210 and a second coil spring (two-stage spring) 220 are disposed in the up-and-down direction of the vehicle 1. In the present embodiment, hereinafter, the multistage elastic member 200 will also be referred to as the multistage elastic member 200.

In FIG. 2B, a first load displacement characteristic 231 indicates a relationship between a load of the first coil spring 210 and a stroke quantity (displacement quantity). The inclination of the first load displacement characteristic 231 is a first spring constant $K_1$ of the first coil spring 210. In addition, a second load displacement characteristic 232 indicates a relationship between a load of the first coil spring 210 and the second coil spring 220 and a stroke quantity (displacement quantity). The inclination of the second load displacement characteristic 232 is a combined elastic coefficient (combined spring constant $K_{12}$) acquired by combining the second spring constant $K_2$ of the second coil spring 220 alone and the first spring constant $K_1$ of the first coil spring 210. The multistage elastic member 200 includes a spring (first coil spring 210) of a first member and a spring (second coil spring 220) of a second member, and inclinations are discontinuous at a connection point 233 where a straight line indicating the first load displacement characteristic 231 having the first elastic coefficient (first spring constant $K_1$) of the first member as an inclination is connected with a straight line indicating a second load displacement characteristic 232 having the combined elastic coefficient (combined spring constant $K_{12}$) as an inclination acquired by combining the first elastic coefficient (first spring constant $K_1$) with the second elastic coefficient (second spring constant $K_2$) of the second member.

As illustrated in FIG. 2B, the first load displacement characteristic 231 and the second load displacement characteristic 232 are connected with each other at the connection point 233. The first load displacement characteristic 231 and the second load displacement characteristic 232 are different in inclination ($K_1 \neq K_2$), and therefore the inclinations are discontinuous (break point) at the connection point 233 where they are connected with each other.

In a range from a load 0 to equal to or smaller than a load $F_1$, the first coil spring 210 is elastically displaced as indicated by the first load displacement characteristic 231. In the load $F_1$, the stroke quantity (displacement quantity) of the first coil spring 210 becomes a displacement $\delta_1$. In the range from the load 0 to equal to or smaller than $F_1$, the first load displacement characteristic 231 linearly changes, and the displacement $\delta_1$ indicates the maximum displacement in the elastic displacement of the first coil spring 210.

When a load exceeding the load $F_1$ acts, the second coil spring 220 is elastically displaced in a state where the first coil spring 210 is displaced to the displacement $\delta_1$. In a load $F_2$, the stroke quantity (displacement quantity) of the second coil spring 220 is acquired by $\delta_2 - \delta_1$, and the stroke quantity (displacement quantity) of the first coil spring 210 and the second coil spring 220 becomes a displacement $\delta_2$. In the range from the load $F_1$ to equal to or smaller than the load $F_2$, the second load displacement characteristic 232 linearly changes at a constant inclination (combined spring constant $K_{12}$), and the displacement $\delta_2$ indicates the maximum displacement in the elastic displacement of the first coil spring 210 and the second coil spring 220.

In FIG. 2B, the load displacement characteristic 234 indicates a load displacement characteristic acquired by virtually extending the first load displacement characteristic 231 from the connection point 233, and the inclination of the load displacement characteristic 234 is identical to the inclination (first spring constant $K_1$) of the first load displacement characteristic 231. In addition, in FIG. 2B, a load Fx ($F_1 < Fx < F_2$) indicates an example of a load value acquired from a wheel speed variation. In a case where the stroke quantity corresponding to the load Fx is acquired based on the second load displacement characteristic 232, a true stroke quantity $ST_1$ can be acquired. However, in a case where the stroke quantity corresponding to the load $F_x$ is acquired based on the load displacement characteristic 234, a stroke quantity $ST_2$ includes an error.

In order to acquire an accurate stroke quantity, it is necessary to change (switch) the load displacement characteristic corresponding to the stroke quantity. That is to say, it is determined whether the load that is acting exceeds the connection point 233 (break point). In a case where the estimated stroke quantity or the acting load does not exceed the connection point 233 (break point), the relationship between the load and the stroke quantity is acquired, based on the first load displacement characteristic 231. In addition, in a case where the estimated stroke quantity or the acting load exceeds the connection point 233 (break point), the relationship between the load and the stroke quantity is acquired, based on the second load displacement characteristic 232. A specific process with reference to FIG. 2B will be described later.

[Configuration of Estimation Device 300]

FIG. 3 is a diagram illustrating a configuration of an estimation device 300 according to the first embodiment. A wheel speed sensor 302 detects a wheel speed corresponding to a detection value of the rotation speed of the front wheel FW. An inertial sensor unit 303 detects acceleration and an angular velocity generated in the vehicle 1. The estimation device 300 performs an estimation operation process of various state quantities, a correction process of a state quantity, based on detection signals input from the wheel speed sensor 302 and the inertial sensor unit 303, and conducts various types of operation control of the vehicle 1, based on the state quantity. The estimation device 300 estimates a stroke quantity indicating a displacement in the up-and-down direction, in a multistage elastic member in which a plurality of members, each having a different load displacement characteristic indicating a relationship between a load and a displacement, are disposed in the up-and-down direction of the vehicle.

The wheel speed sensor 302 includes, for example, a rotation speed sensor such as a rotary encoder that outputs a detection signal corresponding to the rotation speed of the front wheel FW of the vehicle 1. In this case, the wheel speed corresponding to the detection value of the rotation speed of the front wheel FW is acquired as a detection value of the vehicle speed.

The inertial sensor unit 303 (inertial measurement unit: IMU) is a sensor unit capable of detecting a behavior of the vehicle 1, by detecting the acceleration and the angular velocity generated in the vehicle 1. The inertial sensor unit 303 can be disposed at any appropriate position of the vehicle 1, for example, in the vicinity of the gravity center of the vehicle 1. The inertial sensor unit 303 includes, as sensors for detecting translational acceleration, an X-axis acceleration sensor 304X for detecting translational acceleration (X-axis acceleration) in X-axis direction (the front-and-rear direction of the vehicle 1), a Y-axis acceleration sensor 304Y for detecting translational acceleration (Y-axis acceleration) in Y-axis direction (the left-and-right direction of the vehicle 1), and a Z-axis acceleration sensor 304Z for detecting translational acceleration (Z-axis acceleration) in Z-axis direction (the up-and-down direction of the vehicle 1).

In addition, the inertial sensor unit 303 includes, as sensors for detecting angular velocity, an X-axis angular velocity sensor 305X for detecting angular velocity around X-axis (X-axis angular velocity), a Y-axis angular velocity sensor 305Y for detecting angular velocity around Y-axis (Y-axis angular velocity), and a Z-axis angular velocity sensor 305Z for detecting angular velocity around Z-axis (Z-axis angular velocity).

The estimation device 300 includes a processing unit 311 configured with a processor such as a CPU, a storage unit 312, and an interface unit 313 (I/F unit). The storage unit 312 includes a RAM 312b for storing a sequential arithmetic operation result (previous value) regarding the estimation operation, a database (lookup table) indicating a relationship between the load acting on the multistage elastic member 200 and the stroke quantity as having been described with reference to FIG. 2B, and a storage unit (ROM 312a) for storing various estimation operation process programs.

The interface unit 313 (I/F unit) transmits and receives signals between an external device including the wheel speed sensor 302 and the inertial sensor unit 303, and the estimation device 300. The estimation device 300 includes an electric control unit (ECU), and is mounted at any appropriate position of the vehicle 1. Note that the estimation device 300 may include a plurality of electronic control units capable of communicating with each other.

The estimation device 300 includes a load calculation unit 310, a state quantity estimation unit 320, a characteristic change unit 330, and a control processing unit 340, each of which serves as either a function implemented by a program installed in the storage unit 312 or a configuration implemented by a hardware configuration.

The load calculation unit 310 calculates a variable ground contact load that is received by the wheel of the vehicle 1 from a ground contact surface, based on a detection signal of the wheel speed sensor 302 for detecting the wheel speed of the vehicle 1.

The state quantity estimation unit 320 inputs the variable ground contact load into the model of the vibration reduction mechanism 94 including the multistage elastic member 200 having the load displacement characteristic of any one of the plurality of members set as an initial value, and estimates the stroke quantity generated in the multistage elastic member 200.

In a case where the estimated load displacement characteristic corresponding to the stroke quantity that has been estimated by the state quantity estimation unit 320 and the load displacement characteristic that is set as the initial value are different from each other, the characteristic change unit 330 changes the setting of the initial value to the estimated load displacement characteristic. The state quantity estimation unit 320 corrects the stroke quantity, based on a result of the estimation operation in which the estimated load displacement characteristic that has been changed by the characteristic change unit 330 is set as a changed initial value.

The control processing unit 340 controls the damping force, by supplying electric current to the coil of the viscous damping member 250 included in the vibration reduction mechanism 94 to change a flow path area of a throttle in a flow path of hydraulic oil filled inside the viscous damping member 250. The control processing unit 340 controls the damping force of the viscous damping member 250, based on the stroke quantity that has been acquired by the state quantity estimation unit 320 so as to suppress the displacement in the up-and-down direction of the multistage elastic member 200. The control processing unit 340 controls the damping force of the viscous damping member 250 by adjusting the flow path area of the throttle in the flow path of the hydraulic oil filled inside the viscous damping member 250, based on the estimated state quantity (for example, the stroke quantity or the stroke speed). For example, the control processing unit 340 is capable of controlling the damping force of the viscous damping member 250 by controlling an actuator such as a solenoid valve or a stepping motor to drive a valve body that makes variable the flow path area of the throttle formed inside the viscous damping member 250 and to adjust the flow path area.

[Modeling of Vibration Reduction Mechanism 94]

Figure 4:
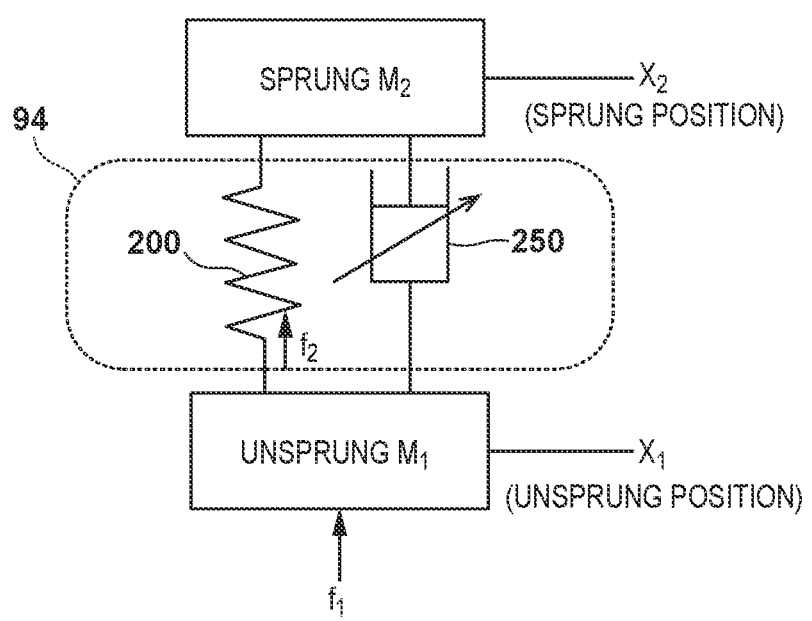
FIG. 4 is a diagram in which a vibration reduction mechanism is modeled.

FIG. 4 is a diagram in which the vibration reduction mechanism 94 is modeled. An upper end portion of the vibration reduction mechanism 94 is swingably supported by the main frames 31, and a lower end portion of the vibration reduction mechanism 94 is swingably supported by the lower link 92. In FIG. 4, an unsprung mass $M_1$ is a mass of the lower link 92, by which a lower end of the vibration reduction mechanism 94 is supported, and a component member connected with the lower link 92. In addition, a sprung mass $M_2$ is a mass of the main frames 31, by which an upper portion of the vibration reduction mechanism 94 is supported, and a component member connected with the main frames 31.

A load $f_1$ is a ground contact load (variable ground contact load) to be input by the rotation of the front wheel FW from a ground contact portion of the front wheel FW into the vibration reduction mechanism 94. A load $f_2$ is a load (compression force) acting on the multistage elastic member 200.

A position $X_1$ indicates a position in the up-and-down direction (unsprung position) of the unsprung mass $M_1$ in the vibration reduction mechanism 94. In addition, a position $X_2$ indicates a position in the up-and-down direction (sprung position) of the sprung mass $M_2$ in the vibration reduction mechanism 94.

The vibration reduction mechanism 94 includes the multistage elastic member 200 and the viscous damping member 250, as component elements. As having been described with reference to FIG. 2A, the multistage elastic member 200 has a configuration of a multistage spring in which the first coil spring (initial spring) 210 and the second coil spring (two-stage spring) 220 are disposed in the up-and-down direction of the vehicle 1.

In addition, the viscous damping member 250 in the present embodiment, although its detailed illustration is omitted, can be configured by use of, for example, a magneto-rheological fluid (MRF) as the hydraulic oil. A piston rod is slidably inserted in an axial direction into a cylinder having a tubular shape filled with the MRF, and the inside of the cylinder is partitioned into an upper oil chamber and a lower oil chamber by a piston attached to a tip end of the piston rod. When electric current is supplied from the control processing unit 340 of the estimation device 300 to the coil located inside the communication path (throttle in the flow path of the hydraulic oil) communicating the upper oil chamber and the lower oil chamber, a magnetic field is applied to the MRF flowing through the communication path, and ferromagnetic fine particles form clusters. Accordingly, the hydraulic oil (MRF) passing through the communication path changes the diameter of the communication path, and changes the damping force of the viscous damping member 250. Note that the configuration of the viscous damping member 250 is not limited to the configuration in which the magnetic field applied to the MRF changes the diameter of the communication path. For example, the control processing unit 340 is also capable of controlling the damping force of the viscous damping member 250, by controlling an actuator such as a solenoid valve or a stepping motor to drive a valve body that makes variable the flow path area of the throttle formed inside the viscous damping member 250 and to adjust the flow path area.

[Process of Load Calculation Unit 310]

The load calculation unit 310 acquires a wheel speed variation based on a detection value of the wheel speed sensor 302, by utilizing the fact that a wheel speed variation $\Delta V_w$ has a constant relationship with a variable ground contact load quantity of the front wheel FW, and performs a process of converting the wheel speed variation into the variable ground contact load.

(Acquisition of Wheel Speed Variation)

The load calculation unit 310 performs a bandpass process (filter process) using a bandpass filter on a detection signal of the wheel speed $V_w$ of the front wheel FW that has been input from the wheel speed sensor 302. The load calculation unit 310 inputs the detection signal of the wheel speed $V_w$ into a bandpass filter having a bandpass characteristic on a predetermined frequency band, and thus acquires a variation quantity (wheel speed variation $\Delta V_w$) of the detection signal of the wheel speed $V_w$ on the predetermined frequency band. Specifically, the load calculation unit 310 acquires the wheel speed variation $\Delta V_w$ through the filter process in which the detection signal of the wheel speed $V_w$ is used as an input.

The bandpass filter has, for example, a bandpass characteristic that allows frequency components of 0.5 Hz to 5 Hz to pass through. The bandpass filter has, for example, a low-pass characteristic that allows bands lower than, for example, approximately 5 Hz to pass through in order to block high-frequency components and make available frequency components of a sprung resonance band (signal in a frequency region corresponding to sprung vibration) with certainty. In addition, the bandpass filter has a high-pass characteristic that allows bands higher than, for example, approximately 0.5 Hz to pass through in order to remove DC components from the detection signal of the wheel speed $V_w$, which is continuously input.

(Conversion of Wheel Speed Variation into Variable Ground Contact Load)

After performing the bandpass process, the load calculation unit 310 performs a gain process of multiplying the variable quantity (wheel speed variation $\Delta V_w$) of the detection signal of the wheel speed $V_w$ by a predetermined gain. While the vehicle 1 is traveling straight on a flat road at a constant speed, the ground contact load of the front wheel FW is constant, and the wheel speed $V_w$ is also constant. However, when the load $f_1$ (variable ground contact load) varies due to a deformed state of the road surface, the wheel speed also varies.

The load calculation unit 310 converts the wheel speed variation $\Delta V_w$ of the front wheel FW into the load $f_1$ (variable ground contact load) by utilizing the fact that the wheel speed variation $\Delta V_w$ and the load $f_1$ (variable ground contact load) have a constant correlation (proportional relationship).

That is, the load calculation unit 310 converts the wheel speed variation $\Delta V_w$ of the front wheel FW into the load $f_1$ (variable ground contact load), based on a conversion equation $f_1 = k \Delta V_w$ (k: proportional constant). The load calculation unit 310 inputs the load $f_1$ (variable ground contact load) that has been converted based on the conversion equation into the model of the vibration reduction mechanism 94 in FIG. 4, and calculates the unsprung position $X_1$, the sprung position $X_2$, a sprung speed ($dX_2/dt$), which is a time differential value of the sprung position, and a stroke speed. Here, the stroke speed is a state quantity ($dX_2/dt - dX_1/dt$) indicating a difference between a time differential value of the sprung position (sprung speed) and a time differential value of the unsprung position (unsprung speed) in the vibration reduction mechanism 94. By integrating the stroke speed, a stroke quantity (stroke $S_{tk} = X_2 - X_1$) indicating a displacement in the up-and-down direction of the vehicle 1, in the multistage elastic member 200, can be acquired.

[Estimation Operation of State Quantity by State Quantity Estimation Unit 320]

The state quantity estimation unit 320 treats the wheel speed variation $\Delta V_w$ of the front wheel FW as external force, and thus is capable of estimating (calculating) various state quantities of the vehicle 1.

In a case where the load $f_1$ (variable ground contact load) is an input f into the model of the vibration reduction mechanism 94, the motion equation can be expressed by Expression (1) as follows.

$$f = M_1 \cdot d^2 X_1 / dt^2 + M_2 \cdot d^2 X_2 / dt^2 \quad (1)$$

Here, $M_1$ represents an unsprung mass, and $M_2$ represents a sprung mass. In addition, $X_1$ represents a position in the up-and-down direction of the unsprung mass $M_1$ in the vibration reduction mechanism 94, and $X_2$ represents a position in the up-and-down direction of the sprung mass $M_2$ in the vibration reduction mechanism 94. Further, $d^2 X_1 / dt^2$ represents acceleration in the up-and-down direction acting on the unsprung mass $M_1$, and $d^2 X_2 / dt^2$ represents acceleration in the up-and-down direction acting on the sprung mass $M_2$.

Here, the unsprung mass $M_1$ and the sprung mass $M_2$ are known. On the other hand, as the input f, the load $f_1$ (variable ground contact load), which is an unsprung load, and a load (compressive force) $f_2$ acting on the multistage elastic member 200 are included. However, the load (compressive force) $f_2$ can be acquired, based on the load $f_1$ (variable ground contact load) in the model of the vibration reduction mechanism 94.

Therefore, when the load $f_1$ (variable ground contact load) can be calculated based on the wheel speed $V_w$ (wheel speed variation $\Delta V_w$), the load $f_1$ (variable ground contact load) and the load (compressive force) $f_2$, which has been calculated based on the load $f_1$, can be set as input values $f(f_2)$ of the load. In addition, by using a system matrix that takes account of the input values $f(f_2)$ of the load, the spring constant of the multistage elastic member 200 ($K_1$ is used in an initial estimation operation), the unsprung mass $M_1$, and the sprung mass $M_2$, the state quantity estimation unit 320 is capable of acquiring various state quantities in the model of the vibration reduction mechanism 94. Specifically, the state quantity estimation unit 320 is capable of acquiring, as various state quantities, the unsprung and sprung accelerations in the up-and-down direction $d^2 X_1 / dt^2$ and $d^2 X_2 / dt^2$, the unsprung speed $dX_1 / dt$, the sprung speed $dX_2 / dt$, the stroke speed $S_s$ ($=dX_2/dt-dX_1/dt$) indicating a difference between the sprung speed and the unsprung speed, and the like.

To be more specific, $M_1 \cdot d^2 X_1 / dt^2$ and $M_2 \cdot d^2 X_2 / dt^2$ in the above Expression (1) can be respectively expressed as Expressions (2) and (3) as follows.

$$M_1 \cdot d^2 X_1 / dt^2 = f_1 - K_i \cdot (X_1 - X_2) - f_2 \quad (2)$$

$$M_2 \cdot d^2 X_2 / dt^2 = K_i \cdot (X_1 - X_2) + f_2 \quad (3)$$

Here, $f_1$ represents a variable ground contact load that is an unsprung load, and $f_2$ represents a load (compressive force) acting on the multistage elastic member 200. In addition, $K_i$ represents a spring constant used in the initial estimation operation. In a case where the spring constant of the first coil spring is set as an initial value, the spring constant $K_i$ of the initial value is the first spring constant $K_1$. The initial value of the spring constant $K_i$ in Expressions (2) and (3) is set by a parameter that is changeable in accordance with a result of the estimation operation of the state quantity. For example, a combined spring constant Kit may be set as the initial value, based on the result of the estimation operation of the state quantity. Further, in the second embodiment to be described later, a combined spring constant $K_{13}$ may be set as the initial value, and in the third embodiment, a combined spring constant Kit may be set as the initial value, or a combined spring constant $K_{23}$ may be set. The setting of the spring constant $K_i$ is similar to the setting in Expression (6) to be described later.

Then, in the model of the vibration reduction mechanism 94 in FIG. 4, the state quantity estimation unit 320 generates the state equation of Expression (4) as follows, and calculates a state variable in Expression (5) as follows from an input vector $f(f_1, f_2)$.

$$dx/dt = Ax + Bf \quad (4)$$

$$x = [X_1 \, X_2 \, dX_1/dt \, dX_2/dt]^T \quad (5)$$

Here, in Expressions (4) and (5), x represents a state variable vector, and A and B represent system matrices. From above Expressions (2) to (5), Expression (4) is expressed as following Expression (6). In Expression (6), $K_i$ represents either an elastic coefficient (spring constant: initial value) of a load displacement characteristic to be set in step S61 of FIG. 6 or an elastic coefficient (spring constant: changed initial value) of the load displacement characteristic to be changed in step S67. In addition, in Expression (6), "." represents a time differential, and ".." represents a second-order differential of time.

[MATH. 1]

$$\dot{x} = \begin{bmatrix} \dot{X}_1 \\ \dot{X}_2 \\ \ddot{X}_1 \\ \ddot{X}_2 \end{bmatrix} = \begin{bmatrix} 0 & 0 & 1 & 0 \\ 0 & 0 & 0 & 1 \\ \frac{-K_i}{M_1} & \frac{K_i}{M_1} & 0 & 0 \\ \frac{K_i}{M_2} & \frac{-K_i}{M_2} & 0 & 0 \end{bmatrix} \begin{bmatrix} X_1 \\ X_2 \\ \dot{X}_1 \\ \dot{X}_2 \end{bmatrix} + \begin{bmatrix} 0 & 0 \\ 0 & 0 \\ \frac{1}{M_1} & -\frac{1}{M_1} \\ 0 & \frac{1}{M_2} \end{bmatrix} \begin{bmatrix} f_1 \\ f_2 \end{bmatrix} \quad (6)$$

Figure 5:
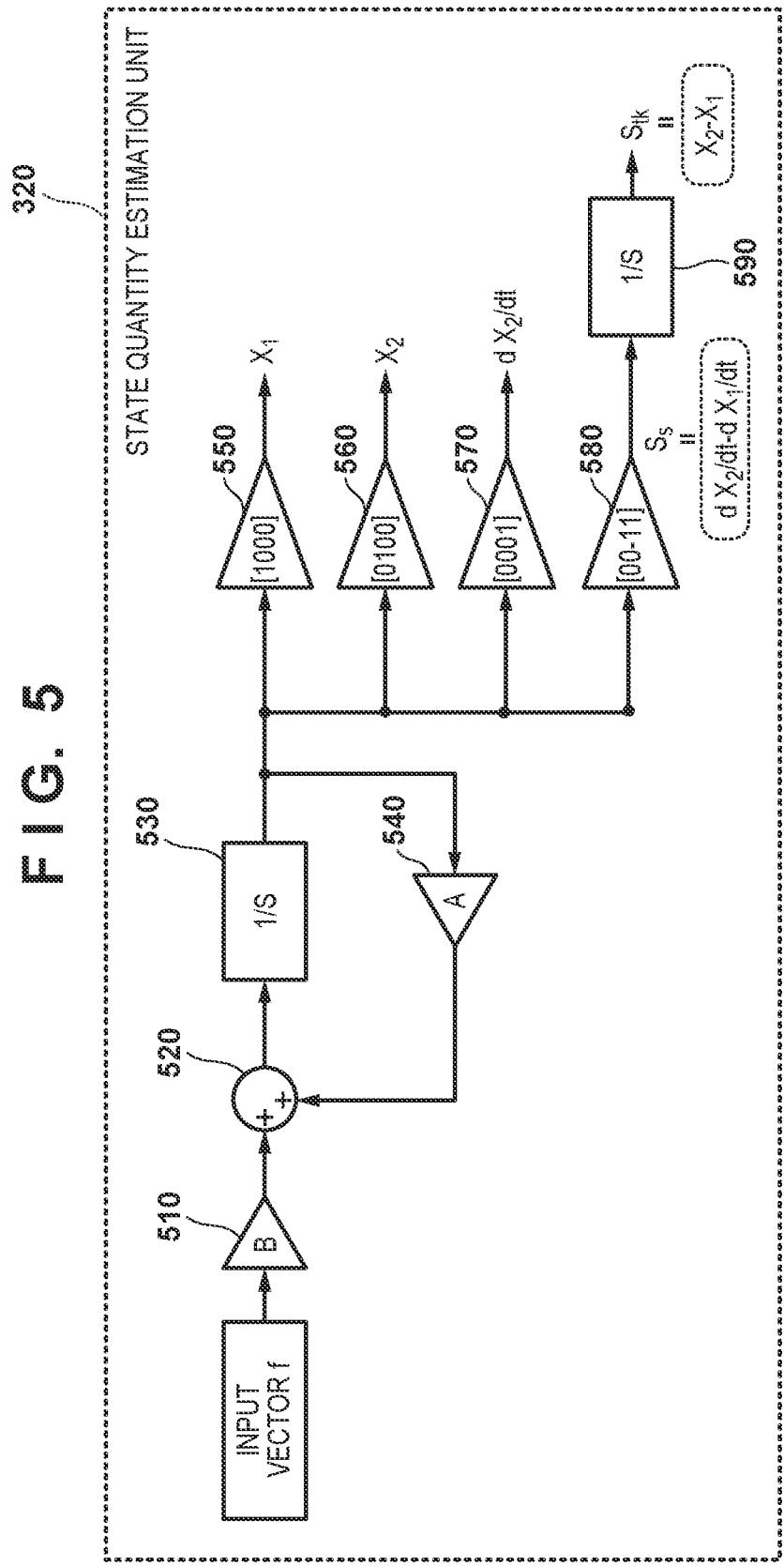
FIG. 5 is a block diagram for describing a process of a state quantity estimation unit 320.

FIG. 5 is a block diagram for describing a process of the state quantity estimation unit 320. In FIG. 5, "1/S" is assumed to represent an integral operation. Regarding the model of the vibration reduction mechanism 94 using the state equation such as Expression (6), the state quantity estimation unit 320 inputs an input vector $f(f_1, f_2)$ into an arithmetic operation unit 510 using the system matrix B as illustrated in FIG. 5. Then, the state quantity estimation unit 320 inputs an output from the arithmetic operation unit 510 into an integrator 530 through an adder 520. Then, the state quantity estimation unit 320 performs a process of inputting an output from the integrator 530 into an arithmetic unit 540 using the system matrix A, and returning an output from the arithmetic unit 540 to the adder 520. By acquiring outputs of first to fourth observation matrices 550 to 580, based on these processes, the state quantity estimation unit 320 is capable of estimating (calculating) the unsprung position $X_1$, the sprung position $X_2$, the sprung speed $S_2(dX_2/dt)$, and the stroke speed $S_s(dX_2/dt - dX_1/dt)$.

Note that the first observation matrix 550 is an unsprung position observation matrix, and is [1 0 0 0]. The second observation matrix 560 is a sprung position observation matrix, and is [0 1 0 0]. The third observation matrix 570 is a sprung speed observation matrix, and is [0 0 0 1]. The fourth observation matrix 580 is a stroke speed observation matrix, and is [0 0 -1 1].

The state quantity estimation unit 320 performs a series of arithmetic operation processes using the arithmetic operation unit 510, the adder 520, the integrator 530, the arithmetic unit 540, and the first to fourth observation matrices 550 to 580 illustrated in FIG. 5 by using the load $f_1$ (variable ground contact load) that has been converted from the wheel speed variation $\Delta V_w$, and thus is capable of estimating (calculating) the unsprung position $X_1$, the sprung position $X_2$, the sprung speed $S_2$, and the stroke speed $S_s$ (=$dX_2$/dt−$dX_1$/dt) as the state quantities.

Specifically, the state quantity estimation unit 320 inputs the load $f_1$ (variable ground contact load) based on the wheel speed $V_w$ (wheel speed variation $\Delta V_w$) into the model of the vibration reduction mechanism 94, and thus is capable of calculating the stroke speed $S_s$ of the multistage elastic member 200.

The state quantity estimation unit 320 further sequentially calculates the stroke speed $S_s$ in a predetermined period of time (for example, time $T_1$ to time $T_N$), performs an integration process by an integrator 590, and thus is capable of estimating (calculating) the stroke quantity (stroke $S_{tk}$) (which is a difference ($X_2$−$X_1$) between the sprung position $X_2$ and the unsprung position $X_1$ of the multistage elastic member 200 at the present time point. The stroke $S_{tk}$ of the multistage elastic member 200 estimated (calculated) here becomes a stroke quantity generated based on the load $f_2$ acting on the multistage elastic member 200, when the load $f_1$ (variable ground contact load) is input into the vibration reduction mechanism 94.

By calculating the state quantity such as the stroke speed $S_s$ from the load $f_1$ that is the ground contact load (variable ground contact load) and integrating the stroke speed $S_s$, the stroke $S_{tk}$ of the multistage elastic member 200 at the present time point is acquirable. This eliminates the need for providing, in the vehicle 1, a vertical G sensor (acceleration sensor) or a stroke sensor for detecting the stroke (a difference between the sprung position $X_2$ and the unsprung position $X_1$) of the multistage elastic member 200, and the cost reduction of the estimation device 300 is achievable.

[Process Flow of Estimation Device]

Next, a process flow of the estimation device 300 will be described. FIG. 6 is a flowchart illustrating the process flow of the estimation device 300.

In step S61, the processing unit 311 of the estimation device 300 sets an initial value of a load displacement characteristic indicating a relationship between the load and the stroke quantity (displacement quantity), as a parameter used in the estimation operation of a state quantity (S65). The processing unit 311 sets a first load displacement characteristic 231 (first spring constant $K_1$) indicating a relationship (FIG. 2B) between the load of the first coil spring 210 and the stroke quantity (displacement quantity), as the initial value of the load displacement characteristic. Note that the setting of the initial value is not limited to the first load displacement characteristic 231 (first spring constant $K_1$), and may be the second load displacement characteristic 232.

In step S62, the wheel speed sensor 302 acquires a wheel speed corresponding to a detection value (detection signal) of the rotation speed of the front wheel FW, and inputs the detection value into the estimation device 300.

In step S63, the load calculation unit 310 of the estimation device 300 performs a bandpass process using a bandpass filter on the detection signal of the wheel speed $V_w$ of the front wheel FW that has been input from the wheel speed sensor 302, and acquires the wheel speed variation $\Delta V_w$.

In step S64, the load calculation unit 310 converts the wheel speed variation $\Delta V_w$ of the front wheel FW into the load $f_1$ (variable ground contact load) by utilizing the fact that the wheel speed variation $\Delta V_w$ and the load $f_1$ (variable ground contact load) have a constant correlation (proportional relationship). That is to say, the state quantity estimation unit 320 converts the wheel speed variation $\Delta V_w$ of the front wheel FW into the load $f_1$ (variable ground contact load), based on the conversion equation of ($f_1$=$k\Delta V_w$ (k: proportional constant).

In step S65, the state quantity estimation unit 320 estimates (calculates) various state quantities in the vibration reduction mechanism 94 of the vehicle 1, by using the load $f_1$ (variable ground contact load). The estimation operation of the state quantity by the state quantity estimation unit 320 denotes arithmetic operation processes in accordance with Expressions (1) to (6) that have been described above and the block diagram of FIG. 5.

The state quantity estimation unit 320 performs a series of arithmetic operation processes using the arithmetic operation unit 510, the adder 520, the integrator 530, the arithmetic unit 540, and the first to fourth observation matrices 550 to 580 illustrated in FIG. 5 by using the load $f_1$ (variable ground contact load) that has been converted from the wheel speed variation $\Delta V_w$, and thus estimates (calculates) the unsprung position $X_1$, the sprung position $X_2$, the sprung speed $S_2$, and the stroke speed $S_s$ as the state quantities.

In addition, the state quantity estimation unit 320 sequentially calculates the stroke speed $S_s$ in a predetermined period of time, and performs the integration process by the integrator 590, and estimates (calculates) the stroke $S_{tk}$ (difference between the sprung position $X_2$ and the unsprung position $X_1$) of the multistage elastic member 200 at the present time point.

In step S66, the characteristic change unit 330 of the estimation device 300 refers to a database in the storage unit (ROM 312a), and determines whether the estimated stroke quantity (stroke $S_{tk}$) of the multistage elastic member 200 falls within a range of the stroke quantity of the load displacement characteristic that has been used in the estimation operation. In the initial estimation operation, the first load displacement characteristic 231 (first spring constant $K_1$), which has been set as the initial value, is used.

In a case where the estimated stroke quantity (stroke $S_{tk}$) falls within the range (0 to $\delta_1$) of the stroke quantity of the first load displacement characteristic 231, the characteristic change unit 330 determines that the load displacement characteristic corresponding to the estimated stroke quantity (stroke $S_{tk}$) and the first load displacement characteristic in the initial setting are identical to each other (S66—No), and advances the process to step S69.

In step S69, in a case where the estimated load displacement characteristic corresponding to the stroke quantity that has been estimated by the state quantity estimation unit 320 and the load displacement characteristic that has been set as the initial value match each other, the characteristic change unit 330 maintains the setting of the initial value. Specifically, the characteristic change unit 330 maintains the setting of the load displacement characteristic used in the estimation operation. For example, in a case where the first load displacement characteristic 231 is set as the load displacement characteristic used in the estimation operation, the characteristic change unit 330 maintains the setting of the first load displacement characteristic 231.

Then, the control processing unit 340 of the estimation device 300 conducts various types of operation control of the vehicle 1, by using the state quantity (for example, the stroke quantity) estimated in step S65. The control processing unit 340 controls the damping force of the viscous damping member 250 by adjusting the flow path area of the throttle of the hydraulic oil filled inside the viscous damping member 250, based on the estimated stroke quantity. For example, the control processing unit 340 controls the damping force of the viscous damping member 250, by driving a valve body that makes variable the flow path area of the throttle formed inside the viscous damping member 250 by use of an actuator such as a solenoid valve or a stepping motor to adjust the flow path area. This enables vibration suppression control for suppressing the vibration generated in accordance with a change in situation of the road surface.

The control processing unit 340 returns the process to step S62, and the estimation device 300 repeatedly performs a similar process.

On the other hand, in the determination in step S66, in a case where the estimated stroke quantity (stroke $S_{tk}$) does not fall within the range (0 to $\delta_1$) of the stroke quantity of the first load displacement characteristic 231, the characteristic change unit 330 determines that the load displacement characteristic (estimated load displacement characteristic) corresponding to the estimated stroke quantity (stroke $S_{tk}$) and the first load displacement characteristic in the initial setting are different from each other.

For example, in a case where the estimated stroke quantity (stroke $S_{tk}$) falls within the range Otto $\delta_2$) of the stroke quantity, the load displacement characteristic corresponding to the estimated stroke quantity (stroke $S_{tk}$) becomes the second load displacement characteristic 232. In this case, the characteristic change unit 330 determines that the second load displacement characteristic 232 corresponding to the estimated stroke quantity (stroke $S_{tk}$) and the first load displacement characteristic 231 of the initial setting are different from each other (S66—Yes), and advances the process to step S67.

In step S67, the characteristic change unit 330 changes the setting of the load displacement characteristic used in the estimation operation. In a case where the state quantity estimation unit 320 estimates the stroke quantity that falls within the stroke range of the second load displacement characteristic as the estimated load displacement characteristic by an arithmetic operation in which the first load displacement characteristic 231 is set as the initial value, the characteristic change unit 330 changes the setting of the first load displacement characteristic 231 as the initial value to the second load displacement characteristic 232. For example, in a case where the first load displacement characteristic 231 is set as the load displacement characteristic used in the estimation operation, the characteristic change unit 330 changes the setting of the first load displacement characteristic 231 to the second load displacement characteristic 232. By this change in the setting, the first load displacement characteristic 231 set as the initial value in step S61 is changed to the second load displacement characteristic 232.

In the estimation operation of the state quantity in next step S65, the second load displacement characteristic 232 that has been changed becomes the initial value (changed initial value). The setting of the initial value is not fixed. In a case where the load displacement characteristic corresponding to the estimated stroke quantity (stroke $S_{tk}$) and the load displacement characteristic of the initial setting are different from each other (S66—Yes), the characteristic change unit 330 sequentially changes the setting of the load displacement characteristic of the initial value or the changed initial value to the load displacement characteristic (estimated load displacement characteristic) corresponding to a newly estimated stroke quantity (stroke $S_{tk}$).

Note that in the present embodiment, the description is given for the configuration of the multistage elastic member 200 having the configuration of the multistage spring in which the first coil spring (initial spring) 210 and the second coil spring (two-stage spring) 220 are disposed in the up-and-down direction of the vehicle 1. However, a similar process applies to a case where three or more coil springs are disposed in the up-and-down direction of the vehicle 1. For example, in the configuration in which the three coil springs are disposed in the up-and-down direction of the vehicle 1, the characteristic change unit 330 is capable of selecting and changing any one of the three load displacement characteristics corresponding to the respective coil springs, based on a result of the estimation operation.

Then, in step S68, the state quantity estimation unit 320 performs the estimation operation using the second load displacement characteristic 232. The estimation operation performed in the present step is similar to the estimation operation in step S65. However, the parameter corresponding to the second load displacement characteristic 232 among the parameters used in the estimation operation of the state quantity is changed. To be specific, in the state equation of Expression (6), as the overall spring constant of the multistage elastic member 200 corresponding to the second load displacement characteristic 232, a combined elastic coefficient (combined spring constant $K_{12}$) acquired by combining the second spring constant $K_2$ of the second coil spring 220 alone with the first spring constant $K_1$ of the first coil spring 210 is set to the coefficient $K_1$ of the system matrix A.

The state quantity estimation unit 320 corrects the state quantity acquired by the estimation operation in the previous step S65, based on a result of the estimation operation that has been acquired by using the system matrix A in which the combined spring constant $K_{12}$ is set to the coefficient $K_i$. The state quantity estimation unit 320 corrects the stroke quantity that has been estimated by the arithmetic operation in which the first load displacement characteristic 231 is set as the initial value, based on a result of the estimation operation in which the second load displacement characteristic 232 is set as the changed initial value. When the combined spring constant $K_{12}$ corresponding to the second load displacement characteristic 232 is set to the coefficient $K_1$ of the system matrix A of Expression (6), the state quantity estimation unit 320 calculates the state quantity, based on the system matrix A in which the combined spring constant $K_{12}$ is set. The state quantity estimation unit 320 corrects the state quantity that has been acquired by the estimation operation in step S65, by use of the state quantity (combined state quantity) acquired by adding the state quantity (for example, a difference between the displacement $ST_1$ corresponding to $F_X$ and the displacement $\delta_1$ in FIG. 2B: $ST_1 - \delta_1$) that has been estimated based on the second load displacement characteristic 232 (combined spring constant $K_{12}$) to the state quantity (for example, the displacement $\delta_1$ corresponding to $F_1$ in FIG. 2B) that has been estimated based on the first load displacement characteristic 231 (first spring constant $K_1$).

Then, the control processing unit 340 conducts various types of operation control of the vehicle 1 using the corrected state quantity. For example, the control processing unit 340 controls the damping force of the viscous damping member 250, by driving the valve body that makes variable the flow path area of the hydraulic oil filled inside the viscous damping member 250 by use of the control of the actuator based on the estimated state quantity to adjust the flow path area. This enables vibration suppression control for suppressing the vibration generated in accordance with a change in situation of the road surface.

Then, the control processing unit 340 returns the process to step S62, and the estimation device 300 repeatedly performs a similar process.

Note that the similar process applies to a case where the second load displacement characteristic 232 is set as the initial value in step S61 and a case where the second load displacement characteristic 232 is set as the initial value that has been changed (changed initial value) in step S67. In a case where the state quantity estimation unit 320 estimates the stroke quantity that falls within the stroke range of the first load displacement characteristic 231 as the estimated load displacement characteristic by an arithmetic operation in which the second load displacement characteristic 232 is set as the initial value (S66—Yes), the characteristic change unit 330 changes the setting of the second load displacement characteristic 232 as the initial value to the first load displacement characteristic 231 (S67).

The state quantity estimation unit 320 corrects the stroke quantity that has been estimated by the operation in which the second load displacement characteristic 232 is set as the initial value, based on a result of the estimation operation in which the first load displacement characteristic 231 is set as the changed initial value (S68).

According to the present embodiment, the stroke quantity can be accurately acquired in the estimation operation of the state quantity of the multistage elastic member 200 including the first coil spring 210 and the second coil spring 220.

That is to say, in a case where the load displacement characteristic corresponding to the stroke quantity that has been estimated by the estimation operation and the load displacement characteristic in the initial setting in the estimation operation are different from each other, the load displacement characteristic is changed so as to match both the load displacement characteristics, so that the stroke quantity can be accurately acquired in the estimation operation of the state quantity.

Second Embodiment

Next, a configuration in a second embodiment of the present invention will be described. In the first embodiment that has been described above, the description has been given for the configuration in which the first coil spring 210 and the second coil spring 220 are disposed in the up-and-down direction of the vehicle 1, as the configuration of the multistage elastic member 200 (multistage spring). However, in the present embodiment, a description will be given for a configuration using bump stop rubber (hereinafter, also simply referred to as "rubber") as a member in place of the second coil spring 220.

Figure 7A:
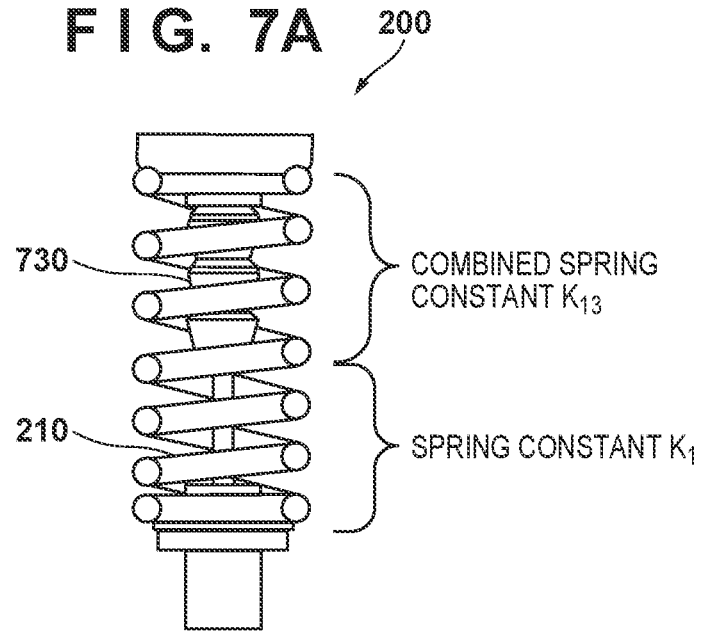
FIG. 7A is a diagram illustrating a schematic configuration example of a multistage elastic member in a second embodiment.

FIG. 7A is a diagram illustrating a schematic configuration example of the multistage elastic member 200 constituting the vibration reduction mechanism 94 in the second embodiment. In the present embodiment, the multistage elastic member 200 constituting the vibration reduction mechanism 94 has a configuration in which rubber 730 is inserted inside a first coil spring (initial spring) 210, and the first coil spring and the rubber 730 are disposed in parallel with each other.

Figure 7B:
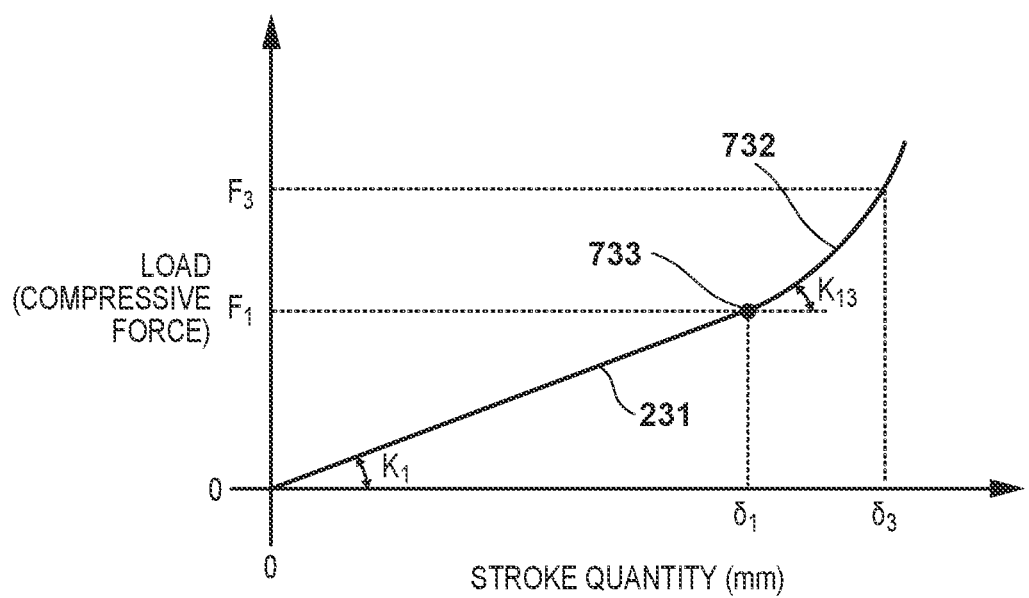
FIG. 7B is a diagram illustrating a relationship between the load and the stroke quantity.

FIG. 7B is a diagram illustrating a relationship between a load (compressive force) acting on the multistage elastic member 200 and a stroke quantity (displacement quantity). In FIG. 7B, the first load displacement characteristic 231 indicates a relationship between the load of the first coil spring 210 and the stroke quantity (displacement quantity).

The inclination of the first load displacement characteristic 231 is a first spring constant $K_1$ of the first coil spring 210. In addition, a third load displacement characteristic 732 indicates a relationship between a load on the first coil spring 210 and the rubber 730 and a stroke quantity (displacement quantity). The inclination ($K_{13}$) of the third load displacement characteristic 732 is the combined elastic coefficient (combined spring constant $K_{13}$) acquired by combining a third spring constant $K_3$ of the rubber 730 with the first spring constant $K_1$ of the first coil spring 210. The multistage elastic member in the present embodiment includes the spring of the first member (first coil spring 210) and the rubber of a third member (rubber 730). The inclinations are discontinuous at a connection point 733 where the straight line indicating the first load displacement characteristic 231 having the first elastic coefficient (first spring constant $K_1$) of the first member as an inclination is connected with a third load displacement characteristic 732 having a combined elastic coefficient (combined spring constant $K_{13}$) as an inclination acquired by combining the first elastic coefficient (first spring constant $K_1$) of the first member with the third elastic coefficient (third spring constant $K_3$) of the third member (rubber 730).

As illustrated in FIG. 7B, the first load displacement characteristic 231 and the third load displacement characteristic 732 are connected with each other at the connection point 733. The first load displacement characteristic 231 and the third load displacement characteristic 732 are different in inclination ($K_1 \ne K_3$), and thus the inclinations are discontinuous (break point) at the connection point 733 where they are connected with each other.

In a range from a load 0 to equal to or smaller than a load $F_1$, the first coil spring 210 is elastically displaced as indicated by the first load displacement characteristic 231. In the load $F_1$, the stroke quantity (displacement quantity) of the first coil spring 210 becomes a displacement $\delta_1$. In the range from the load 0 to equal to or smaller than the load $F_1$, the first load displacement characteristic 231 linearly changes at a constant inclination (first spring constant $K_1$), and the displacement $\delta_1$ indicates the maximum displacement in the elastic displacement of the first coil spring 210.

When a load exceeding the load $F_1$ is applied, the first coil spring 210 is displaced to the displacement $\delta_1$, and in such a state, after contacting the rubber 730, the rubber 730 is displaced based on the third load displacement characteristic 732. In a load $F_3$, the stroke quantity (displacement quantity) of the rubber 730 is acquired by $\delta_3-\delta_1$, and the stroke quantity (displacement quantity) of the first coil spring 210 and the rubber 730 becomes a displacement $\delta_3$. In the range from the load $F_1$ to equal to or smaller than the load $F_3$, the third load displacement characteristic 732 changes at an inclination (third spring constant $K_3$), and the displacement $\delta_3$ indicates the maximum displacement in the elastic displacement of the first coil spring 210 and the rubber 730.

In order to accurately acquire the stroke quantity (stroke $S_{tk}$) in the estimation operation of the state quantity (S65) that has been described in FIG. 6, it is necessary to determine whether the load displacement characteristic corresponding to the stroke quantity that has been estimated by the estimation operation and the load displacement characteristic of the initial setting in the estimation operation are different from each other, and to change (switch) the load displacement characteristic in a case where they are different from each other.

In a case where the stroke quantity that has been estimated by the estimation operation falls within the load range of the load displacement characteristic of the initial setting, the characteristic change unit 330 determines that the load displacement characteristic (estimated load displacement characteristic) corresponding to the stroke quantity (stroke $S_{tk}$) that has been estimated by the estimation operation and the load displacement characteristic of the initial setting in the estimation operation are identical to each other.

On the other hand, in a case where the stroke quantity that has been estimated by the estimation operation does not fall within the load range of the load displacement characteristic (for example, 231) in the initial setting, that is, in a case where the stroke quantity exceeds the connection point 733 (break point) and falls within the load range of another load displacement characteristic (for example, 732), the characteristic change unit 330 determines that the load displacement characteristic (estimated load displacement characteristic) corresponding to the stroke quantity (stroke $S_{tk}$) that has been estimated by the estimation operation and the load displacement characteristic of the initial setting in the estimation operation are different from each other.

[Process Flow of Estimation Device]

The basic flow of the process of the estimation device 300 is similar to that in FIG. 6, but is different in that the rubber 730 is used in place of the second coil spring 220 in the process in steps S66 to S68.

In step S66, the characteristic change unit 330 of the estimation device 300 refers to a database in the storage unit (ROM 312a), and determines whether the estimated stroke quantity (stroke $S_{tk}$) of the multistage elastic member 200 falls within a range of the stroke quantity of the load displacement characteristic that has been used in the estimation operation. In the initial estimation operation, the first load displacement characteristic 231 (first spring constant $K_1$), which has been set as the initial value, is used. In a case where the estimated stroke quantity (stroke $S_{tk}$) falls within the range (0 to $\delta_1$) of the stroke quantity of the first load displacement characteristic 231, the characteristic change unit 330 determines that the load displacement characteristic corresponding to the estimated stroke quantity (stroke $S_{tk}$) and the first load displacement characteristic in the initial setting are identical to each other (S66—No), and advances the process to step S69.

In step S69, in a case where the estimated load displacement characteristic corresponding to the stroke quantity that has been estimated by the state quantity estimation unit 320 and the load displacement characteristic that has been set as the initial value match each other, the characteristic change unit 330 maintains the setting of the initial value. Specifically, the characteristic change unit 330 maintains the setting of the load displacement characteristic used in the estimation operation. For example, in a case where the first load displacement characteristic 231 is set as the load displacement characteristic used in the estimation operation, the characteristic change unit 330 maintains the setting of the first load displacement characteristic 231.

On the other hand, in the determination in step S66, in a case where the estimated stroke quantity (stroke $S_{tk}$) does not fall within the range (0 to $\delta_1$) of the stroke quantity of the first load displacement characteristic 231, the characteristic change unit 330 determines that the load displacement characteristic (estimated load displacement characteristic) corresponding to the estimated stroke quantity (stroke $S_{tk}$) and the first load displacement characteristic in the initial setting are different from each other. For example, in a case where the estimated stroke quantity (stroke $S_{tk}$) falls within the range ($\delta_1$ to $\delta_3$) of the stroke quantity exceeding the connection point 733 (break point), the load displacement characteristic corresponding to the estimated stroke quantity (stroke $S_{tk}$) becomes the third load displacement characteristic 732. In this case, the characteristic change unit 330 determines that the third load displacement characteristic 732 corresponding to the estimated stroke quantity (stroke $S_{tk}$) and the first load displacement characteristic 231 in the initial setting are different from each other (S66—Yes), and advances the process to step S67.

In step S67, the characteristic change unit 330 changes the setting of the load displacement characteristic used in the estimation operation. In a case where the state quantity estimation unit 320 estimates the stroke quantity that falls within the stroke range of the third load displacement characteristic as the estimated load displacement characteristic by the arithmetic operation in which the first load displacement characteristic 231 is set as the initial value, the characteristic change unit 330 changes the setting in which the first load displacement characteristic 231 is set as the initial value to the third load displacement characteristic 732. For example, in a case where the first load displacement characteristic 231 is set as the load displacement characteristic used in the estimation operation, the characteristic change unit 330 changes the setting of the first load displacement characteristic 231 to the third load displacement characteristic 732. By this change in the setting, the first load displacement characteristic 231 set as the initial value in step S61 is changed to the third load displacement characteristic 732.

In the estimation operation of the state quantity in next step S65, the third load displacement characteristic 732 that has been changed becomes the initial value (changed initial value). The setting of the initial value is not fixed. In a case where the load displacement characteristic (estimated load displacement characteristic) corresponding to the estimated stroke quantity (stroke $S_{tk}$) and the load displacement characteristic of the initial setting are different from each other (S66—Yes), the characteristic change unit 330 sequentially changes the setting of the load displacement characteristic of the initial value or the changed initial value to the load displacement characteristic (estimated load displacement characteristic) corresponding to a newly estimated stroke quantity (stroke $S_{tk}$).

Then, in step S68, the state quantity estimation unit 320 performs the estimation operation using the third load displacement characteristic 732 that has been changed. The estimation operation performed in the present step is similar to the estimation operation in step S65. However, the parameter corresponding to the third load displacement characteristic 732 among the parameters used in the estimation operation of the state quantity is changed. To be specific, in the state equation of Expression (6), the combined spring constant $K_{13}$ is set to the coefficient $K_i$ of the system matrix A, as the overall spring constant of the multistage elastic member 200 corresponding to the third load displacement characteristic 732.

The state quantity estimation unit 320 corrects the state quantity acquired by the estimation operation in the previous step S65, based on a result of the estimation operation acquired by using the system matrix A in which the combined spring constant $K_{13}$ is set to the coefficient $K_i$. The state quantity estimation unit 320 corrects the stroke quantity estimated by the arithmetic operation in which the first load displacement characteristic is set as the initial value, based on a result of the estimation operation in which the third load displacement characteristic is set as the changed initial value. When the combined spring constant $K_{13}$ corresponding to the third load displacement characteristic 732 is set to the coefficient $K_1$ of the system matrix A of Expression (6), the state quantity estimation unit 320 calculates the state quantity, based on the system matrix A in which the combined spring constant $K_{13}$ is set. The state quantity estimation unit 320 corrects the state quantity acquired by the estimation operation in step S65 by use of the state quantity (combined state quantity) acquired by adding the state quantity that has been estimated based on the third load displacement characteristic 732 (combined spring constant $K_{13}$) to the state quantity that has been estimated based on the first load displacement characteristic 231 (first spring constant $K_1$).

Then, the control processing unit 340 conducts various types of operation control of the vehicle 1 using the corrected state quantity. The control processing unit 340 controls the damping force of the viscous damping member 250 by adjusting the flow path area of the throttle of the hydraulic oil filled inside the viscous damping member 250, based on the estimated stroke quantity. For example, the control processing unit 340 controls the damping force of the viscous damping member 250, by driving a valve body that makes variable the flow path area of the throttle formed inside the viscous damping member 250 by use of an actuator such as a solenoid valve or a stepping motor to adjust the flow path area. This enables vibration suppression control for suppressing the vibration generated in accordance with a change in situation of the road surface.

Then, the control processing unit 340 returns the process to step S62, and the estimation device 300 repeatedly performs a similar process.

Note that the similar process applies to a case where the third load displacement characteristic 732 is set as the initial value in step S61 and a case where the third load displacement characteristic 732 is set as the initial value that has been changed (changed initial value) in step S67. In a case where the state quantity estimation unit 320 estimates the stroke quantity that falls within the stroke range of the first load displacement characteristic 231 as the estimated load displacement characteristic by an arithmetic operation in which the third load displacement characteristic 732 is set as the initial value (S66—Yes), the characteristic change unit 330 changes the setting of the third load displacement characteristic 732 as the initial value to the first load displacement characteristic 231 (S67).

The state quantity estimation unit 320 corrects the stroke quantity that has been estimated by the arithmetic operation in which the third load displacement characteristic 732 is set as the initial value, based on a result of the estimation operation in which the first load displacement characteristic 231 is set as the changed initial value (S68).

According to the present embodiment, the stroke quantity can be accurately acquired in the estimation operation of the state quantity of the multistage elastic member 200 including the first coil spring 210 and the rubber 730.

That is to say, in a case where the load displacement characteristic corresponding to the stroke quantity that has been estimated by the estimation operation and the load displacement characteristic in the initial setting in the estimation operation are different from each other, the load displacement characteristic is changed so as to match both the load displacement characteristics, so that the stroke quantity can be accurately acquired in the estimation operation of the state quantity.

Third Embodiment

Next, a configuration in a third embodiment of the present invention will be described. In the first embodiment that has been described above, the description has been given for the configuration in which the first coil spring 210 and the second coil spring 220 are disposed in the up-and-down direction of the vehicle 1, as the configuration of the multistage elastic member 200 (multistage spring), and in the second embodiment, the description has been given for the configuration in which the first coil spring 210 and the rubber 730 are disposed in parallel with each other. In the present embodiment, a description will be given for a configuration in which the first coil spring 210 and the second coil spring 220 are disposed in series with each other in the up-and-down direction of the vehicle 1, and the second coil spring 220 and the rubber 730 are disposed in parallel with each other.

Figure 8A:
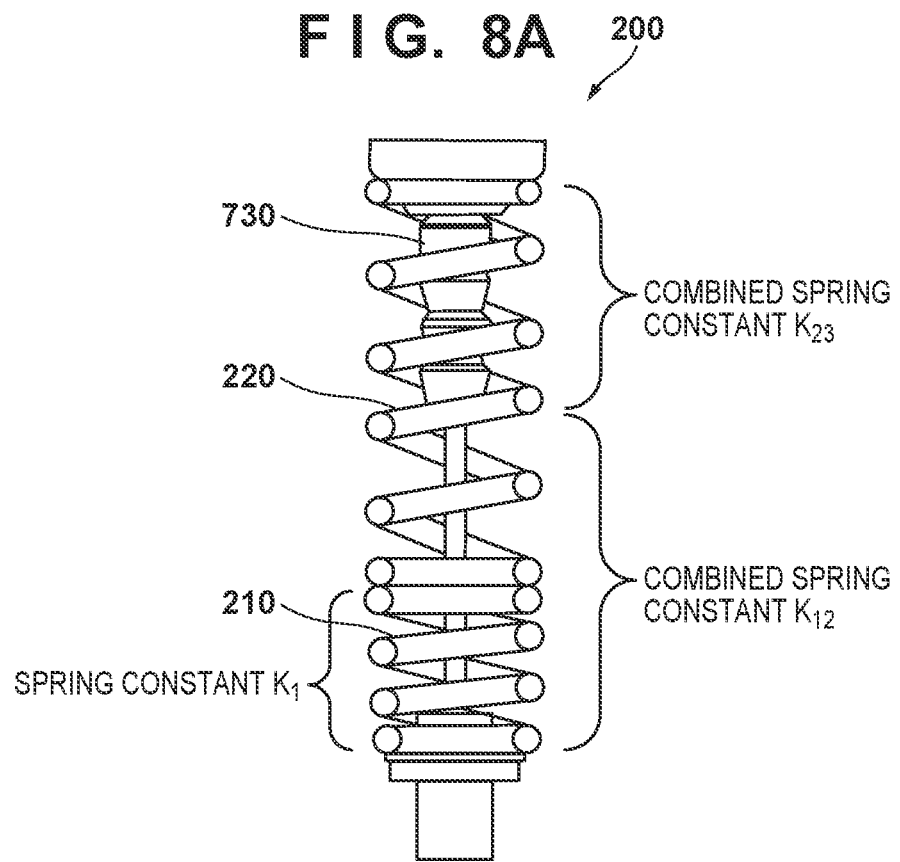
FIG. 8A is a diagram illustrating a schematic configuration example of a multistage elastic member in a third embodiment.

FIG. 8A is a diagram illustrating a schematic configuration example of the multistage elastic member 200 constituting the vibration reduction mechanism 94 in the third embodiment. In the present embodiment, the multistage elastic member 200 constituting the vibration reduction mechanism 94 has a configuration in which the first coil spring (initial spring) 210 and the second coil spring 220 are disposed in the up-and-down direction of the vehicle 1, the rubber 730 is inserted inside the second coil spring 220, and the second coil spring 220 and the rubber 730 are disposed in parallel with each other.

Figure 8B:
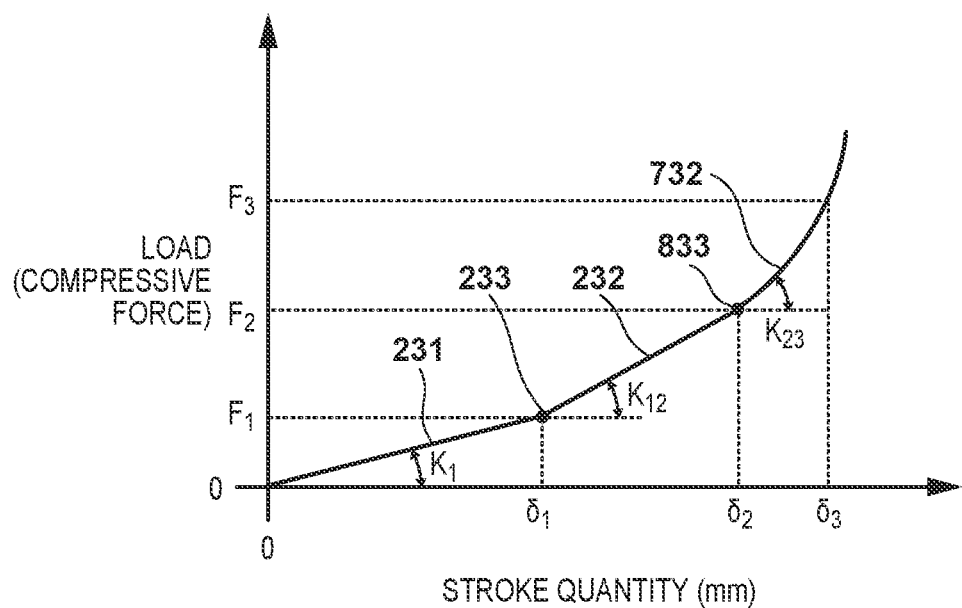
FIG. 8B is a diagram illustrating a relationship between the load and the stroke quantity.

FIG. 8B is a diagram illustrating a relationship between a load (compressive force) acting on the multistage elastic member 200 and a stroke quantity (displacement quantity). In FIG. 8B, the first load displacement characteristic 231 indicates a relationship between the load of the first coil spring 210 and the stroke quantity (displacement quantity). The inclination of the first load displacement characteristic 231 is a first spring constant $K_1$ of the first coil spring 210. In addition, the second load displacement characteristic 232 indicates a relationship between the load of the first coil spring 210 and the second coil spring 220 and a stroke quantity (displacement quantity). The inclination ($K_{12}$) of the second load displacement characteristic 232 is a combined elastic coefficient (combined spring constant $K_{12}$) acquired by combining the second spring constant $K_2$ of the second coil spring 220 with the first spring constant $K_1$ of the first coil spring 210.

In addition, the third load displacement characteristic 732 indicates a relationship between the load on the second coil spring 220 and the rubber 730 and the stroke quantity (displacement quantity). The inclination ($K_{23}$) of the third load displacement characteristic 732 is a combined elastic coefficient (combined spring constant $K_{23}$) acquired by combining the third spring constant $K_3$ of the rubber 730 with the second spring constant $K_2$ of the second coil spring 220. The multistage elastic member 200 in the present embodiment includes a spring (first coil spring 210) of a first member, a spring (second coil spring 220) of a second member, and rubber (rubber 730) of a third member. The inclinations are discontinuous at the connection point 233 where the straight line indicating the first load displacement characteristic 231 having the first elastic coefficient (first spring constant $K_1$) of the first member as an inclination is connected with the straight line indicating the second load displacement characteristic 232 having a combined elastic coefficient (combined spring constant $K_{12}$) as an inclination acquired by combining the first elastic coefficient (first spring constant $K_1$) of the first member with the second elastic coefficient (second spring constant $K_2$) of the second member. In addition, the inclinations are discontinuous at a connection point 833 where the straight line indicating the second load displacement characteristic 232 is connected with the third load displacement characteristic 732 having a combined elastic coefficient (combined spring constant $K_{23}$) as an inclination acquired by combining the second elastic coefficient (second spring constant $K_2$) of the second member with the third elastic coefficient (third spring constant $K_3$) of the third member (rubber 730).

As illustrated in FIG. 8B, the first load displacement characteristic 231 and the second load displacement characteristic 232 are connected with each other at the connection point 233. In addition, the second load displacement characteristic 232 and the third load displacement characteristic 732 are connected with each other at the connection point 833. The first load displacement characteristic 231 and the second load displacement characteristic 232 are different in inclination ($K_1 \neq K_2$), and thus the inclinations are discontinuous (first break point) at the connection point 233 where they are connected with each other. Further, the second load displacement characteristic 232 and the third load displacement characteristic 732 are different in inclination ($K_2 \neq K_3$), and thus the inclinations are discontinuous (second break point) at the connection point 833 where they are connected with each other.

In a range from a load 0 to equal to or smaller than a load $F_1$, the first coil spring 210 is elastically displaced as indicated by the first load displacement characteristic 231. In the load $F_1$, the stroke quantity (displacement quantity) of the first coil spring 210 becomes a displacement $\delta_1$. In the range from the load 0 to equal to or smaller than the load $F_1$, the first load displacement characteristic 231 linearly changes at a constant inclination (first spring constant $K_1$), and the displacement $\delta_1$ indicates the maximum displacement in the elastic displacement of the first coil spring 210.

When a load exceeding the load $F_1$ acts, the second coil spring 220 is elastically displaced in a state where the first coil spring 210 is displaced to the displacement $\delta_1$. In a load $F_2$, the stroke quantity (displacement quantity) of the second coil spring 220 is acquired by $\delta_2 - \delta_1$, and the stroke quantity (displacement quantity) of the first coil spring 210 and the second coil spring 220 becomes a displacement $\delta_2$. In the range from the load $F_1$ to equal to or smaller than the load $F_2$, the second load displacement characteristic 232 linearly changes at a constant inclination (combined spring constant $K_{12}$), and the displacement $\delta_2$ indicates the maximum displacement in the elastic displacement of the first coil spring 210 and the second coil spring 220.

When a load exceeding the load $F_2$ acts, the rubber 730 is elastically displaced in a state where the first coil spring 210 and the second coil spring 220 are displaced to the displacement $\delta_2$. In the load $F_3$, the stroke quantity (displacement quantity) of the rubber 730 is acquired by $\delta_3 - \delta_2$, and the stroke quantity (displacement quantity) of the first coil spring 210, the second coil spring 220, and the rubber 730 becomes the displacement $\delta_3$. In the range from the load $F_2$ to equal to or smaller than the load $F_3$, the third load displacement characteristic 732 changes at an inclination (third spring constant $K_3$), and the displacement $\delta_3$ indicates the maximum displacement in the first coil spring 210, the second coil spring 220, and the rubber 730.

In order to accurately acquire the stroke quantity (stroke $S_{tk}$) in the estimation operation of the state quantity (S65) that has been described in FIG. 6, it is necessary to determine whether the load displacement characteristic corresponding to the stroke quantity that has been estimated by the estimation operation and the load displacement characteristic of the initial setting in the estimation operation are different from each other, and to change (switch) the load displacement characteristic in a case where they are different from each other.

In a case where the stroke quantity that has been estimated by the estimation operation falls within the load range of the load displacement characteristic of the initial setting, the characteristic change unit 330 determines that the load displacement characteristic (estimated load displacement characteristic) corresponding to the stroke quantity (stroke $S_{tk}$) that has been estimated by the estimation operation and the load displacement characteristic of the initial setting in the estimation operation are identical to each other.

On the other hand, in a case where the stroke quantity that has been estimated by the estimation operation does not fall within the load range of the load displacement characteristic (for example, 231) in the initial setting, that is, in a case where the stroke quantity exceeds the connection point 233 (first break point) or the connection point 833 (second break point) and falls within the load range of another load displacement characteristic (for example, 232 or 732), the characteristic change unit 330 determines that the load displacement characteristic (estimated load displacement characteristic) corresponding to the stroke quantity (stroke $S_{tk}$) that has been estimated by the estimation operation and the load displacement characteristic of the initial setting in the estimation operation are different from each other.

[Process Flow of Estimation Device]

The basic flow of the process of the estimation device 300 is similar to that in FIG. 6, but is different in that the first coil spring 210, the second coil spring 220, and the rubber 730 are used in the process in steps S66 to S68.

In step S66, the characteristic change unit 330 of the estimation device 300 refers to a database in the storage unit (ROM 312*a*), and determines whether the estimated stroke quantity (stroke $S_{tk}$) of the multistage elastic member 200 falls within a range of the stroke quantity of the load displacement characteristic that has been used in the estimation operation. In the initial estimation operation, the first load displacement characteristic 231 (first spring constant $K_1$), which has been set as the initial value, is used. In a case where the estimated stroke quantity (stroke $S_{tk}$) falls within the range (0 to $\delta_1$) of the stroke quantity of the first load displacement characteristic 231, the characteristic change unit 330 determines that the load displacement characteristic corresponding to the estimated stroke quantity (stroke $S_{tk}$) and the first load displacement characteristic in the initial setting are identical to each other (S66—No), and advances the process to step S69.

In step S69, in a case where the estimated load displacement characteristic corresponding to the stroke quantity that has been estimated by the state quantity estimation unit 320 and the load displacement characteristic that has been set as the initial value match each other, the characteristic change unit 330 maintains the setting of the initial value. Specifically, the characteristic change unit 330 maintains the setting of the load displacement characteristic used in the estimation operation. For example, in a case where the first load displacement characteristic 231 is set as the load displacement characteristic used in the estimation operation, the characteristic change unit 330 maintains the setting of the first load displacement characteristic 231.

On the other hand, in the determination in step S66, in a case where the estimated stroke quantity (stroke $S_{tk}$) does not fall within the range (0 to $\delta_1$) of the stroke quantity of the first load displacement characteristic 231, the characteristic change unit 330 determines that the load displacement characteristic corresponding to the estimated stroke quantity (stroke $S_{tk}$) and the first load displacement characteristic of the initial setting are different from each other.

For example, in a case where the estimated stroke quantity (stroke $S_{tk}$) falls within the range ($\delta_1$ to $\delta_2$) of the stroke quantity exceeding the connection point 233 (first break point), the load displacement characteristic (estimated load displacement characteristic) corresponding to the estimated stroke quantity (stroke $S_{tk}$) becomes the second load displacement characteristic 232. In this case, the characteristic change unit 330 determines that the second load displacement characteristic 232 corresponding to the estimated stroke quantity (stroke $S_{tk}$) and the first load displacement characteristic of the initial setting are different from each other (S66—Yes), and advances the process to step S67.

Alternatively, in a case where the estimated stroke quantity (stroke $S_{tk}$) falls within the range ($\delta_2$ to $\delta_3$) of the stroke quantity exceeding the connection point 733 (second break point), the load displacement characteristic (estimated load displacement characteristic) corresponding to the estimated stroke quantity (stroke $S_{tk}$) becomes the third load displacement characteristic 732. In this case, the characteristic change unit 330 determines that the third load displacement characteristic 732 corresponding to the estimated stroke quantity (stroke $S_{tk}$) and the first load displacement characteristic of the initial setting are different from each other (S66—Yes), and advances the process to step S67.

In step S67, the characteristic change unit 330 changes the setting of the load displacement characteristic used in the estimation operation. In a case where the state quantity estimation unit 320 estimates either one of the stroke quantity that falls within the stroke range of the second load displacement characteristic 232 or the stroke quantity that falls within the stroke range of the third load displacement characteristic 732, as the estimated load displacement characteristic, by the arithmetic operation in which the first load displacement characteristic 231 is set as the initial value, the characteristic change unit 330 changes the setting of the first load displacement characteristic 231 as the initial value to the load displacement characteristic corresponding to the above one of the stroke quantities. For example, in a case where the first load displacement characteristic 231 is set as the load displacement characteristic used in the estimation operation, the characteristic change unit 330 changes the setting of the first load displacement characteristic 231 to either the second load displacement characteristic 232 or the third load displacement characteristic 732, based on a determination result of step S66. By this change in the setting, the first load displacement characteristic 231 set as the initial value in step S61 is changed to either the second load displacement characteristic 232 or the third load displacement characteristic 732.

In the estimation operation of the state quantity in next step S65, the second load displacement characteristic 232 or the third load displacement characteristic 732 that has been changed becomes the initial value (changed initial value). The setting of the initial value is not fixed. In a case where the load displacement characteristic (estimated load displacement characteristic) corresponding to the estimated stroke quantity (stroke $S_{tk}$) and the load displacement characteristic of the initial setting are different from each other (S66—Yes), the characteristic change unit 330 sequentially changes the setting of the load displacement characteristic of the initial value to the load displacement characteristic (estimated load displacement characteristic) corresponding to a newly estimated stroke quantity (stroke $S_{tk}$).

Then, in step S68, the state quantity estimation unit 320 performs the estimation operation using the second load displacement characteristic 232 or the third load displacement characteristic 732 that has been changed. The estimation operation performed in the present step is similar to the estimation operation in step S65. However, the parameter corresponding to the second load displacement characteristic 232 or the third load displacement characteristic 732 among the parameters used in the estimation operation of the state quantity is changed.

In a case where the first load displacement characteristic 231 is changed to the second load displacement characteristic 232, the combined spring constant $K_{12}$ is set to the coefficient $K_i$ of the system matrix A in the state equation of Expression (6), as the overall spring constant of the multistage elastic member 200 corresponding to the second load displacement characteristic 232.

In addition, in a case where the first load displacement characteristic 231 is changed to the third load displacement characteristic 732, the combined spring constant $K_{23}$ is set to the coefficient $K_i$ of the system matrix A in the state equation of Expression (6), as the overall spring constant of the multistage elastic member 200 corresponding to the third load displacement characteristic 732.

The state quantity estimation unit 320 corrects the state quantity acquired by the estimation operation in the previous step S65, based on a result of the estimation operation that has been acquired by using the system matrix A in which the combined spring constant $K_{12}$ is set to the coefficient $K_i$. The state quantity estimation unit 320 corrects the stroke quantity that has been estimated by the arithmetic operation in which the first load displacement characteristic 231 is set as the initial value, based on a result of the estimation operation in which the load displacement characteristic corresponding to the above one of the stroke quantities is set as the changed initial value. When the combined spring constant $K_{12}$ corresponding to the second load displacement characteristic 232 is set to the coefficient $K_i$ of the system matrix A of Expression (6), the state quantity estimation unit 320 calculates the state quantity, based on the system matrix A in which the combined spring constant $K_{12}$ is set. In this case, the state quantity estimation unit 320 corrects the state quantity that has been acquired by the estimation operation in step S65 by use of the state quantity (combined state quantity) acquired by adding the state quantity that has been estimated based on the second load displacement characteristic 232 (combined spring constant $K_{12}$) to the state quantity that has been estimated based on the first load displacement characteristic 231 (first spring constant $K_1$).

In addition, when the combined spring constant $K_{23}$ corresponding to the third load displacement characteristic 732 is set to the coefficient $K_i$ of the system matrix A of Expression (6), the state quantity estimation unit 320 calculates the state quantity, based on the system matrix A in which the combined spring constant $K_{23}$ is set. In this case, the state quantity estimation unit 320 corrects the state quantity that has been acquired by the estimation operation in step S65 by use of the state quantity (combined state quantity) acquired by adding the state quantity that has been estimated based on the third load displacement characteristic 732 (combined spring constant $K_{23}$) to the state quantity that has been estimated based on the first load displacement characteristic 231 (first spring constant $K_1$) and the state quantity that has been estimated based on the second load displacement characteristic 232 (combined spring constant $K_{12}$).

Then, the control processing unit 340 conducts various types of operation control of the vehicle 1 using the corrected state quantity. The control processing unit 340 controls the damping force of the viscous damping member 250 by adjusting the flow path area of the throttle of the hydraulic oil filled inside the viscous damping member 250, based on the estimated stroke quantity. For example, the control processing unit 340 controls the damping force of the viscous damping member 250, by driving a valve body that makes variable the flow path area of the throttle formed inside the viscous damping member 250 by use of an actuator such as a solenoid valve or a stepping motor to adjust the flow path area. This enables vibration suppression control for suppressing the vibration generated in accordance with a change in situation of the road surface.

Then, the control processing unit 340 returns the process to step S62, and the estimation device 300 repeatedly performs a similar process.

Note that the similar process applies to a case where either one of the second load displacement characteristic 232 or the third load displacement characteristic 732 is set as the initial value in step S61 and a case where either one of the second load displacement characteristic 232 or the third load displacement characteristic 732 is set as the initial value that has been changed (changed initial value) in step S67. In a case where the state quantity estimation unit 320 estimates the stroke quantity that falls within the stroke range of the first load displacement characteristic as the estimated load displacement characteristic by an arithmetic operation in which the load displacement characteristic of either one of the second load displacement characteristic 232 or the third load displacement characteristic 732 is set as the initial value (S66—Yes), the characteristic change unit 330 changes the setting of the above one of the load displacement characteristic as the initial value to the first load displacement characteristic 231 (S67).

The state quantity estimation unit 320 corrects the stroke quantity that has been estimated by the arithmetic operation in which the above one of the load displacement characteristics is set as the initial value, based on a result of the estimation operation in which the first load displacement characteristic 231 is set as the changed initial value (S68).

According to the present embodiment, the stroke quantity can be accurately acquired in the estimation operation of the state quantity of the multistage elastic member 200 including the first coil spring 210, the second coil spring 220, and the rubber 730.

That is to say, in a case where the load displacement characteristic corresponding to the stroke quantity that has been estimated by the estimation operation and the load displacement characteristic in the initial setting in the estimation operation are different from each other, the load displacement characteristic is changed so as to match both the load displacement characteristics, so that the stroke quantity can be accurately acquired in the estimation operation of the state quantity.

Summary of Embodiments

Configuration 1. The estimation device in the above embodiments is an estimation device (300) that estimates a stroke quantity indicating a displacement in an up-and-down direction of a vehicle (1), in a multistage elastic member (200) in which a plurality of members, each having a different load displacement characteristic indicating a relationship between a load and the displacement, are disposed, the estimation device including:

a load calculation unit (310) configured to calculate a variable ground contact load received by a wheel of the vehicle from a ground contact surface, based on a detection signal of a wheel speed sensor for detecting a wheel speed of the vehicle;

a state quantity estimation unit (320) configured to estimate the stroke quantity generated in the multistage elastic member, based on the multistage elastic member and the variable ground contact load, the multistage elastic member having a load displacement characteristic of any one of the plurality of members set as an initial value; and a characteristic change unit (330) configured to change a setting of the initial value to an estimated load displacement characteristic, in a case where the estimated load displacement characteristic corresponding to the stroke quantity that has been estimated by the state quantity estimation unit and the load displacement characteristic that has been set as the initial value are different from each other, in which the state quantity estimation unit (320) corrects the stroke quantity, based on a result of an estimation operation in which the estimated load displacement characteristic that has been changed by the characteristic change unit is set as a changed initial value.

According to the embodiment in the configuration 1, it is possible to improve the estimation accuracy of the stroke quantity indicating a displacement in the up-and-down direction of the vehicle, in the multistage elastic member in which the plurality of members, each having a different load displacement characteristic indicating a relationship between a load and a displacement, are disposed.

Configuration 2. In the above embodiments, the multistage elastic member (200) includes a spring of a first member (first coil spring 210) and a spring of a second member (second coil spring 220), and inclinations are discontinuous at a connection point (233) where a straight line indicating a first load displacement characteristic (231) having a first elastic coefficient (first spring constant $K_1$) of the first member as an inclination is connected with a straight line indicating a second load displacement characteristic (232) having a combined elastic coefficient (combined spring constant $K_{12}$) as an inclination acquired by combining the first elastic coefficient (first spring constant $K_1$) with a second elastic coefficient (second spring constant $K_2$) of the second member.

Configuration 3. In the above embodiments, in a case where the state quantity estimation unit estimates a stroke quantity that falls within a stroke range of the second load displacement characteristic as the estimated load displacement characteristic by an arithmetic operation in which the first load displacement characteristic is set as an initial value, the characteristic change unit changes the first load displacement characteristic that is set as the initial value to the second load displacement characteristic.

Configuration 4. In the above embodiments, the state quantity estimation unit corrects the stroke quantity that has been estimated by the arithmetic operation in which the first load displacement characteristic is set as the initial value, based on a result of an estimation operation in which the second load displacement characteristic is set as a changed initial value.

Configuration 5. In the above embodiments, in a case where the state quantity estimation unit estimates a stroke quantity that falls within a stroke range of the first load displacement characteristic as the estimated load displacement characteristic by an arithmetic operation in which the second load displacement characteristic is set as an initial value, the characteristic change unit changes the second load displacement characteristic that is set as the initial value to the first load displacement characteristic.

Configuration 6. In the above embodiments, the state quantity estimation unit corrects the stroke quantity that has been estimated by the arithmetic operation in which the second load displacement characteristic is set as the initial value, based on a result of an estimation operation in which the first load displacement characteristic is set as a changed initial value.

According to the embodiments in the configurations 2 to 6, the stroke quantity can be accurately acquired in the estimation operation of the state quantity by use of the multistage elastic member 200 in which the first coil spring 210 and the second coil spring 220 are disposed in the up-and-down direction of the vehicle 1.

That is to say, in a case where the load displacement characteristic corresponding to the stroke quantity that has been estimated by the estimation operation and the load displacement characteristic in the initial setting in the estimation operation are different from each other, the load displacement characteristic is changed so as to match both the load displacement characteristics, so that the stroke quantity can be accurately acquired in the estimation operation of the state quantity.

Configuration 7. In the above embodiments, the multistage elastic member (200) includes a spring of a first member (first coil spring 210) and a rubber (rubber 730) of a third member, and inclinations are discontinuous at a connection point (733) where a straight line indicating a first load displacement characteristic (231) having a first elastic coefficient (first spring constant $K_1$) of the first member as an inclination is connected with a third load displacement characteristic (732) having a combined elastic coefficient (combined elastic constant $K_{13}$) as an inclination acquired by combining the first elastic coefficient (first spring constant $K_1$) with a third elastic coefficient (third spring constant $K_3$) of the third member (rubber 730).

Configuration 8. In the above embodiments, in a case where the state quantity estimation unit estimates a stroke quantity that falls within a stroke range of the third load displacement characteristic as the estimated load displacement characteristic by an arithmetic operation in which the first load displacement characteristic is set as an initial value, the characteristic change unit changes the first load displacement characteristic that is set as the initial value to the third load displacement characteristic.

Configuration 9. In the above embodiments, the state quantity estimation unit corrects the stroke quantity that has been estimated by the arithmetic operation in which the first load displacement characteristic is set as the initial value, based on a result of an estimation operation in which the third load displacement characteristic is set as a changed initial value.

Configuration 10. In the above embodiments, in a case where the state quantity estimation unit estimates a stroke quantity that falls within a stroke range of the first load displacement characteristic as the estimated load displacement characteristic by an arithmetic operation in which the third load displacement characteristic is set as an initial value, the characteristic change unit changes the third load displacement characteristic that is set as the initial value to the first load displacement characteristic.

Configuration 11. In the above embodiments, the state quantity estimation unit corrects the stroke quantity that has been estimated by the arithmetic operation in which the third load displacement characteristic is set as the initial value, based on a result of an estimation operation in which the first load displacement characteristic is set as a changed initial value.

According to the embodiments in the configurations 7 to 11, the stroke quantity can be accurately acquired in the estimation operation of the state quantity by use of the multistage elastic member 200 in which the first coil spring 210 and the rubber 730 are disposed in the up-and-down direction of the vehicle 1.

That is to say, in a case where the load displacement characteristic corresponding to the stroke quantity that has been estimated by the estimation operation and the load displacement characteristic in the initial setting in the estimation operation are different from each other, the load displacement characteristic is changed so as to match both the load displacement characteristics, so that the stroke quantity can be accurately acquired in the estimation operation of the state quantity.

Configuration 12. In the above embodiments, the multistage elastic member (200) includes a spring of a first member (first coil spring 210), a spring of a second member (second coil spring 220), and rubber (rubber 730) of a third member, inclinations are discontinuous at a connection point (233) where a straight line indicating a first load displacement characteristic (231) having a first elastic coefficient (first spring constant $K_1$) of the first member as an inclination is connected with a straight line indicating a second load displacement characteristic (232) having a combined elastic coefficient (combined spring constant $K_{12}$) as an inclination acquired by combining the first elastic coefficient (first spring constant $K_1$) with a second elastic coefficient (second spring constant $K_2$) of the second member, and inclinations are discontinuous at a connection point (833) where the straight line indicating the second load displacement characteristic (232) is connected with a third load displacement characteristic (732) having a combined elastic coefficient (combined spring constant $K_{23}$) as an inclination acquired by combining the second elastic coefficient (second spring constant $K_2$) with a third elastic coefficient (third spring constant $K_3$) of the third member (rubber 730).

Configuration 13. In the above embodiments, in a case where the state quantity estimation unit estimates, as the estimated load displacement characteristic, either one of a stroke quantity that falls within a stroke range of the second load displacement characteristic or a stroke quantity that falls within a stroke range of the third load displacement characteristic by an arithmetic operation in which the first load displacement characteristic is set as an initial value, the characteristic change unit changes the first load displacement characteristic that is set as the initial value to a load displacement characteristic corresponding to the one of the stroke quantities.

Configuration 14. In the above embodiments, the state quantity estimation unit corrects the stroke quantity that has been estimated by the arithmetic operation in which the first load displacement characteristic is set as the initial value, based on a result of an estimation operation in which a load displacement characteristic corresponding to the one of the stoke quantities is set as a changed initial value.

Configuration 15. In the above embodiments, in a case where the state quantity estimation unit estimates a stroke quantity that falls within a stroke range of the first load displacement characteristic as the estimated load displacement characteristic by an arithmetic operation in which either one of the second load displacement characteristic or the third load displacement characteristic is set as an initial value, the characteristic change unit changes the one of the load displacement characteristics that is set as the initial value to the first load displacement characteristic.

Configuration 16. In the above embodiments, the state quantity estimation unit corrects the stroke quantity that has been estimated by an arithmetic operation in which the one of the load displacement characteristics that is set as the initial value, based on a result of an estimation operation in which the first load displacement characteristic is set as a changed initial value.

According to the embodiments in the configurations 12 to 16, the stroke quantity can be accurately acquired in the estimation operation of the state quantity by use of the multistage elastic member 200 in which the first coil spring 210, the second coil spring 220, and the rubber 730 are disposed in the up-and-down direction of the vehicle 1.

That is to say, in a case where the load displacement characteristic corresponding to the stroke quantity that has been estimated by the estimation operation and the load displacement characteristic in the initial setting in the estimation operation are different from each other, the load displacement characteristic is changed so as to match both the load displacement characteristics, so that the stroke quantity can be accurately acquired in the estimation operation of the state quantity.

Configuration 17. In the above embodiments, in a case where an estimated load displacement characteristic corresponding to a stroke quantity that has been estimated by the state quantity estimation unit and the load displacement characteristic that is set as an initial value match each other, the characteristic change unit maintains a setting of the initial value.

According to the embodiment in the configuration 17, in the case where the estimated load displacement characteristic and the load displacement characteristic set as the initial value match each other, the stroke quantity can be accurately acquired by performing the estimation operation of the state quantity while maintaining the setting of the initial value.

Configuration 18. In the above embodiments, a control processing unit (340) configured to control damping force of a viscous damping member (250) included in a vibration reduction mechanism (94) is further included, in which the control processing unit controls the damping force of the viscous damping member by adjusting a flow path area of a throttle of hydraulic oil filled inside the viscous damping member, based on the stroke quantity that has been estimated.

According to the embodiment in the configuration 18, a result of the estimation operation of the stroke quantity can be reflected in controlling the damping force of the viscous damping member. This enables vibration suppression control for suppressing the vibration generated in accordance with a change in situation of the road surface.

Configuration 19. The vehicle in the above embodiments is a vehicle (1) including an estimation device (300) that estimates a stroke quantity indicating a displacement in an up-and-down direction of the vehicle (1), in a multistage elastic member (200) in which a plurality of members, each having a different load displacement characteristic indicating a relationship between a load and the displacement, are disposed, the estimation device (300) including:

a load calculation unit (310) configured to calculate a variable ground contact load received by a wheel of the vehicle from a ground contact surface, based on a detection signal of a wheel speed sensor for detecting a wheel speed of the vehicle;

a state quantity estimation unit (320) configured to estimate the stroke quantity generated in the multistage elastic member, based on the multistage elastic member and the variable ground contact load, the multistage elastic member having a load displacement characteristic of any one of the plurality of members set as an initial value; and a characteristic change unit (330) configured to change a setting of the initial value to an estimated load displacement characteristic, in a case where the estimated load displacement characteristic corresponding to the stroke quantity that has been estimated by the state quantity estimation unit and the load displacement characteristic that has been set as the initial value are different from each other, in which the state quantity estimation unit (320) corrects the stroke quantity, based on a result of an estimation operation in which the estimated load displacement characteristic that has been changed by the characteristic change unit is set as a changed initial value.

According to the embodiment in the configuration 19, it is possible to improve the estimation accuracy of the stroke quantity indicating the displacement in the up-and-down direction of the vehicle, in the multistage elastic member in which the plurality of members, each having a different load displacement characteristic indicating the relationship between the load and the displacement, are disposed.

Configuration 20. An estimation method in the above embodiments is an estimation method of an estimation device (300) that estimates a stroke quantity indicating a displacement in an up-and-down direction of a vehicle (1), in a multistage elastic member (200) in which a plurality of members, each having a different load displacement characteristic indicating a relationship between a load and the displacement, are disposed, the estimation method including:

calculating (S64), by a load calculation unit (310), a variable ground contact load received by a wheel of the vehicle from a ground contact surface, based on a detection signal of a wheel speed sensor for detecting a wheel speed of the vehicle;

estimating (S65), by a state quantity estimation unit (320), the stroke quantity generated in the multistage elastic member, based on the multistage elastic member and the variable ground contact load, the multistage elastic member having a load displacement characteristic of any one of the plurality of members set as an initial value;

changing (S67), by a characteristic change unit (330), a setting of the initial value to an estimated load displacement characteristic, in a case where the estimated load displacement characteristic corresponding to the stroke quantity that has been estimated by the estimating and the load displacement characteristic that has been set as the initial value are different from each other (S66—Yes); and correcting (S68), by the state quantity estimation unit (320), the stroke quantity, based on a result of an estimation operation in which the estimated load displacement characteristic that has been changed by the changing is set as a changed initial value.

According to the embodiment in the configuration 20, it is possible to improve the estimation accuracy of the stroke quantity indicating the displacement in the up-and-down direction of the vehicle, in the multistage elastic member in which the plurality of members, each having a different load displacement characteristic indicating the relationship between the load and the displacement, are disposed.

The invention is not limited to the foregoing embodiments, and various variations/changes are possible within the spirit of the invention.

What is claimed is:

1. An estimation device that estimates a stroke quantity indicating a displacement in an up-and-down direction of a vehicle, in a multistage elastic member in which a plurality of members, each having a different load displacement characteristic indicating a relationship between a load and the displacement, are disposed, the estimation device comprising:
    a load calculation unit configured to calculate a variable ground contact load received by a wheel of the vehicle from a ground contact surface, based on a detection signal of a wheel speed sensor for detecting a wheel speed of the vehicle;
    a state quantity estimation unit configured to estimate the stroke quantity generated in the multistage elastic member, based on the multistage elastic member and the variable ground contact load, the multistage elastic member having a load displacement characteristic of any one of the plurality of members set as an initial value; and
    a characteristic change unit configured to change a setting of the initial value to an estimated load displacement characteristic, in a case where the estimated load displacement characteristic corresponding to the stroke quantity that is estimated by the state quantity estimation unit and the load displacement characteristic that is set as the initial value are different from each other,
    wherein the state quantity estimation unit corrects the stroke quantity, based on a result of an estimation operation in which the estimated load displacement characteristic that is changed by the characteristic change unit is set as a changed initial value.

2. The estimation device according to claim 1, wherein the multistage elastic member includes a spring of a first member and a spring of a second member, and
    inclinations are discontinuous at a connection point where a straight line indicating a first load displacement characteristic having a first elastic coefficient of the first member as an inclination is connected with a straight line indicating a second load displacement characteristic having a combined elastic coefficient as an inclination acquired by combining the first elastic coefficient with a second elastic coefficient of the second member.

3. The estimation device according to claim 2, wherein in a case where the state quantity estimation unit estimates a stroke quantity that falls within a stroke range of the second load displacement characteristic as the estimated load displacement characteristic by an arithmetic operation in which the first load displacement characteristic is set as an initial value,
    the characteristic change unit changes the first load displacement characteristic that is set as the initial value to the second load displacement characteristic.

4. The estimation device according to claim 3, wherein the state quantity estimation unit corrects the stroke quantity that is estimated by the arithmetic operation in which the first load displacement characteristic is set as the initial value, based on a result of an estimation operation in which the second load displacement characteristic is set as a changed initial value.

5. The estimation device according to claim 2, wherein in a case where the state quantity estimation unit estimates a stroke quantity that falls within a stroke range of the first load displacement characteristic as the estimated load displacement characteristic by an arithmetic operation in which the second load displacement characteristic is set as an initial value,
    the characteristic change unit changes the second load displacement characteristic that is set as the initial value to the first load displacement characteristic.

6. The estimation device according to claim 5, wherein the state quantity estimation unit corrects the stroke quantity that is estimated by the arithmetic operation in which the second load displacement characteristic is set as the initial value, based on a result of an estimation operation in which the first load displacement characteristic is set as a changed initial value.

7. The estimation device according to claim 1, wherein the multistage elastic member includes a spring of a first member and rubber of a third member, and
    inclinations are discontinuous at a connection point where a straight line indicating a first load displacement characteristic having a first elastic coefficient of the first member as an inclination is connected with a third load displacement characteristic having a combined elastic coefficient as an inclination acquired by combining the first elastic coefficient with a third elastic coefficient of the third member.

8. The estimation device according to claim 7, wherein in a case where the state quantity estimation unit estimates a stroke quantity that falls within a stroke range of the third load displacement characteristic as the estimated load displacement characteristic by an arithmetic operation in which the first load displacement characteristic is set as an initial value,
    the characteristic change unit changes the first load displacement characteristic that is set as the initial value to the third load displacement characteristic.

9. The estimation device according to claim 8, wherein the state quantity estimation unit corrects the stroke quantity that is estimated by the arithmetic operation in which the first load displacement characteristic is set as the initial value, based on a result of an estimation operation in which the third load displacement characteristic is set as a changed initial value.

10. The estimation device according to claim 7, wherein in a case where the state quantity estimation unit estimates a stroke quantity that falls within a stroke range of the first load displacement characteristic as the estimated load displacement characteristic by an arithmetic operation in which the third load displacement characteristic is set as an initial value,
    the characteristic change unit changes the third load displacement characteristic that is set as the initial value to the first load displacement characteristic.

11. The estimation device according to claim 10, wherein the state quantity estimation unit corrects the stroke quantity that is estimated by the arithmetic operation in which the third load displacement characteristic is set as the initial value, based on a result of an estimation operation in which the first load displacement characteristic is set as a changed initial value.

12. The estimation device according to claim 1, wherein the multistage elastic member includes a spring of a first member, a spring of a second member, and a rubber of a third member, inclinations are discontinuous at a connection point where a straight line indicating a first load displacement characteristic having a first elastic coefficient of the first member as an inclination is connected with a straight line indicating a second load displacement characteristic having a combined elastic coefficient as an inclination acquired by combining the first elastic coefficient with a second elastic coefficient of the second member, and inclinations are discontinuous at a connection point where the straight line indicating the second load displacement characteristic is connected with a third load displacement characteristic having a combined elastic coefficient as an inclination acquired by combining the second elastic coefficient with a third elastic coefficient of the third member.

13. The estimation device according to claim 12, wherein in a case where the state quantity estimation unit estimates, as the estimated load displacement characteristic, either one of a stroke quantity that falls within a stroke range of the second load displacement characteristic or a stroke quantity that falls within a stroke range of the third load displacement characteristic by an arithmetic operation in which the first load displacement characteristic is set as an initial value, the characteristic change unit changes the first load displacement characteristic that is set as the initial value to a load displacement characteristic corresponding to the one of the stroke quantities.

14. The estimation device according to claim 13, wherein the state quantity estimation unit corrects the stroke quantity that is estimated by the arithmetic operation in which the first load displacement characteristic is set as the initial value, based on a result of an estimation operation in which a load displacement characteristic corresponding to the one of the stoke quantities is set as a changed initial value.

15. The estimation device according to claim 12, wherein in a case where the state quantity estimation unit estimates a stroke quantity that falls within a stroke range of the first load displacement characteristic as the estimated load displacement characteristic by an arithmetic operation in which either one of the second load displacement characteristic or the third load displacement characteristic is set as an initial value, the characteristic change unit changes the one of the load displacement characteristics that is set as the initial value to the first load displacement characteristic.

16. The estimation device according to claim 15, wherein the state quantity estimation unit corrects the stroke quantity that is estimated by an arithmetic operation in which the one of the load displacement characteristics that is set as the initial value, based on a result of an estimation operation in which the first load displacement characteristic is set as a changed initial value.

17. The estimation device according to claim 1, wherein in a case where an estimated load displacement characteristic corresponding to a stroke quantity that is estimated by the state quantity estimation unit and the load displacement characteristic that is set as an initial value match each other, the characteristic change unit maintains a setting of the initial value.

18. The estimation device according to claim 1, further comprising a control processing unit configured to control damping force of a viscous damping member included in a vibration reduction mechanism, wherein the control processing unit controls the damping force of the viscous damping member by adjusting a flow path area of a throttle of hydraulic oil filled inside the viscous damping member, based on the stroke quantity that is estimated.

19. A vehicle including an estimation device that estimates a stroke quantity indicating a displacement in an up-and-down direction of the vehicle, in a multistage elastic member in which a plurality of members, each having a different load displacement characteristic indicating a relationship between a load and the displacement, are disposed, the estimation device comprising:

a load calculation unit configured to calculate a variable ground contact load received by a wheel of the vehicle from a ground contact surface, based on a detection signal of a wheel speed sensor for detecting a wheel speed of the vehicle;

a state quantity estimation unit configured to estimate the stroke quantity generated in the multistage elastic member, based on the multistage elastic member and the variable ground contact load, the multistage elastic member having a load displacement characteristic of any one of the plurality of members set as an initial value; and a characteristic change unit configured to change a setting of the initial value to an estimated load displacement characteristic, in a case where the estimated load displacement characteristic corresponding to the stroke quantity that is estimated by the state quantity estimation unit and the load displacement characteristic that is set as the initial value are different from each other, wherein the state quantity estimation unit corrects the stroke quantity, based on a result of an estimation operation in which the estimated load displacement characteristic that is changed by the characteristic change unit is set as a changed initial value.

20. An estimation method of an estimation device that estimates a stroke quantity indicating a displacement in an up-and-down direction of a vehicle, in a multistage elastic member in which a plurality of members, each having a different load displacement characteristic indicating a relationship between a load and the displacement, are disposed, the estimation method comprising:

calculating, by a load calculation unit, a variable ground contact load received by a wheel of the vehicle from a ground contact surface, based on a detection signal of a wheel speed sensor for detecting a wheel speed of the vehicle;

estimating, by a state quantity estimation unit, the stroke quantity generated in the multistage elastic member, based on the multistage elastic member and the variable ground contact load, the multistage elastic member having a load displacement characteristic of any one of the plurality of members set as an initial value;

changing, by a characteristic change unit, a setting of the initial value to an estimated load displacement characteristic, in a case where the estimated load displacement characteristic corresponding to the stroke quantity that is estimated by the estimating and the load displacement characteristic that is set as the initial value are different from each other; and correcting, by the state quantity estimation unit, the stroke quantity, based on a result of an estimation operation in which the estimated load displacement characteristic that is changed by the changing is set as a changed initial value.

\* \* \* \* \*